Sept. 8, 1942. H. T. AVERY 2,294,948
CALCULATING MACHINE
Filed April 29, 1940 9 Sheets-Sheet 1

INVENTOR
HAROLD T. AVERY
BY
ATTORNEY

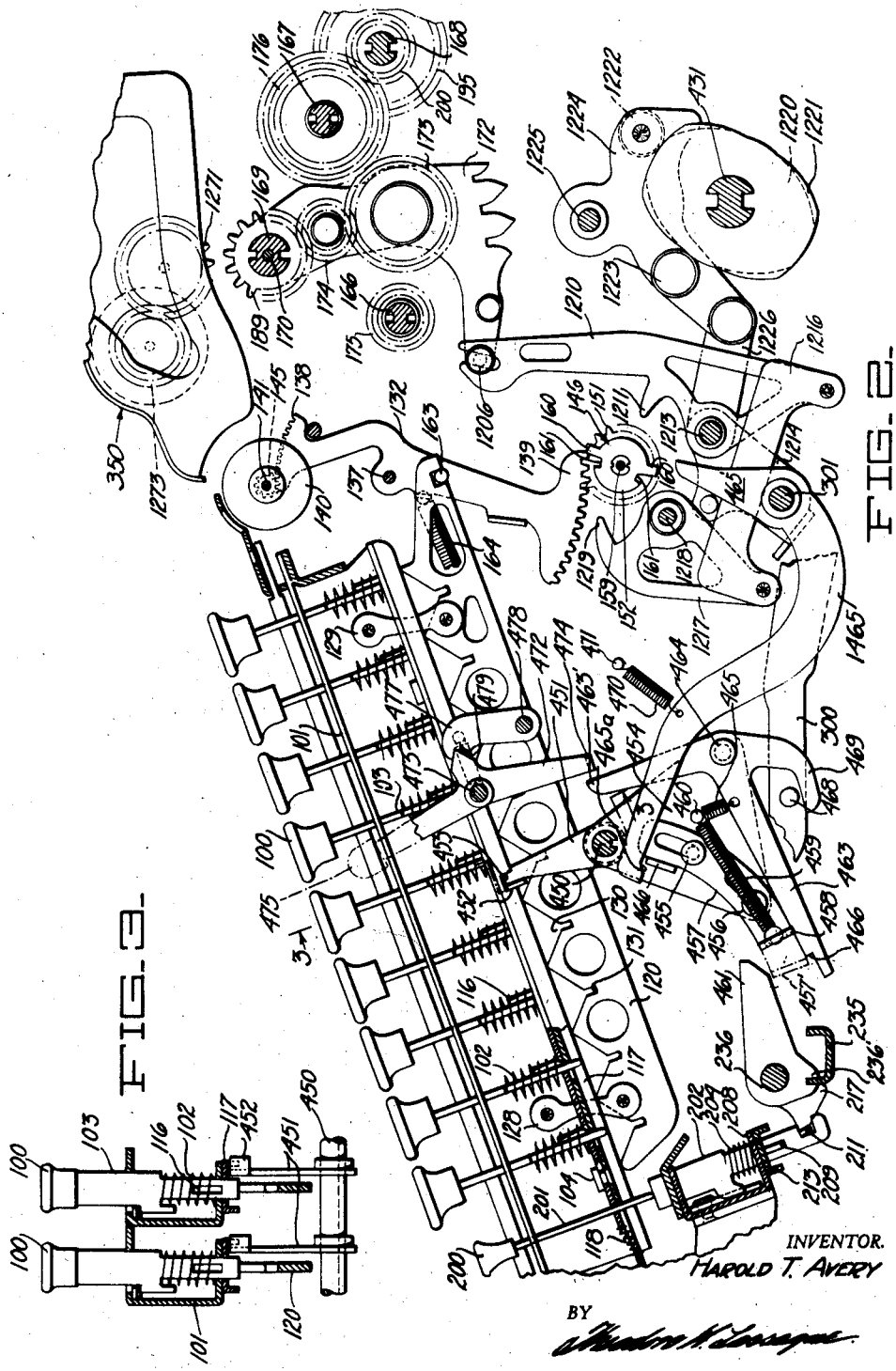

Sept. 8, 1942.   H. T. AVERY   2,294,948
CALCULATING MACHINE
Filed April 29, 1940    9 Sheets-Sheet 3
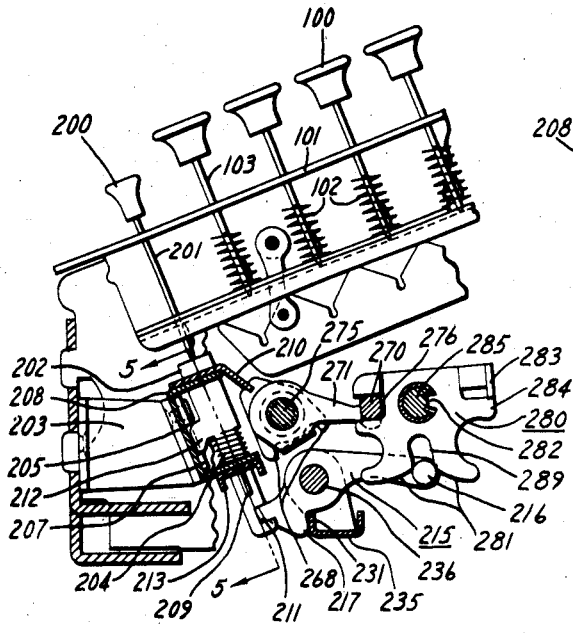
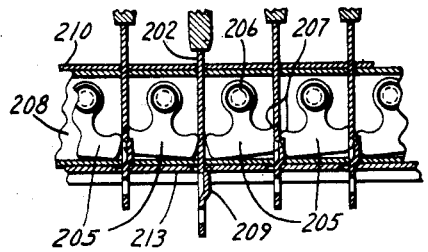
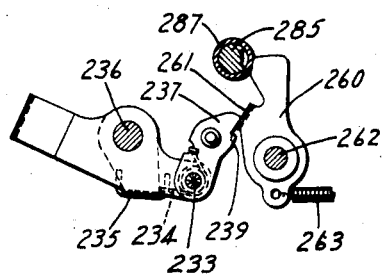
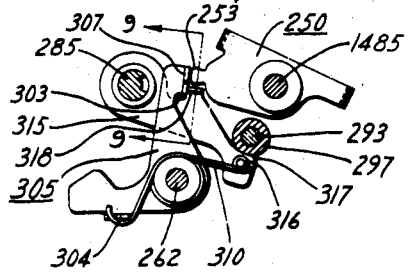
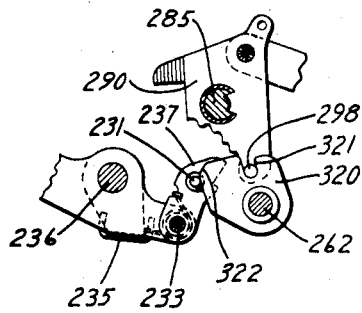
INVENTOR
HAROLD T. AVERY
BY
ATTORNEY Sept. 8, 1942.    H. T. AVERY    2,294,948
CALCULATING MACHINE
Filed April 29, 1940    9 Sheets-Sheet 4
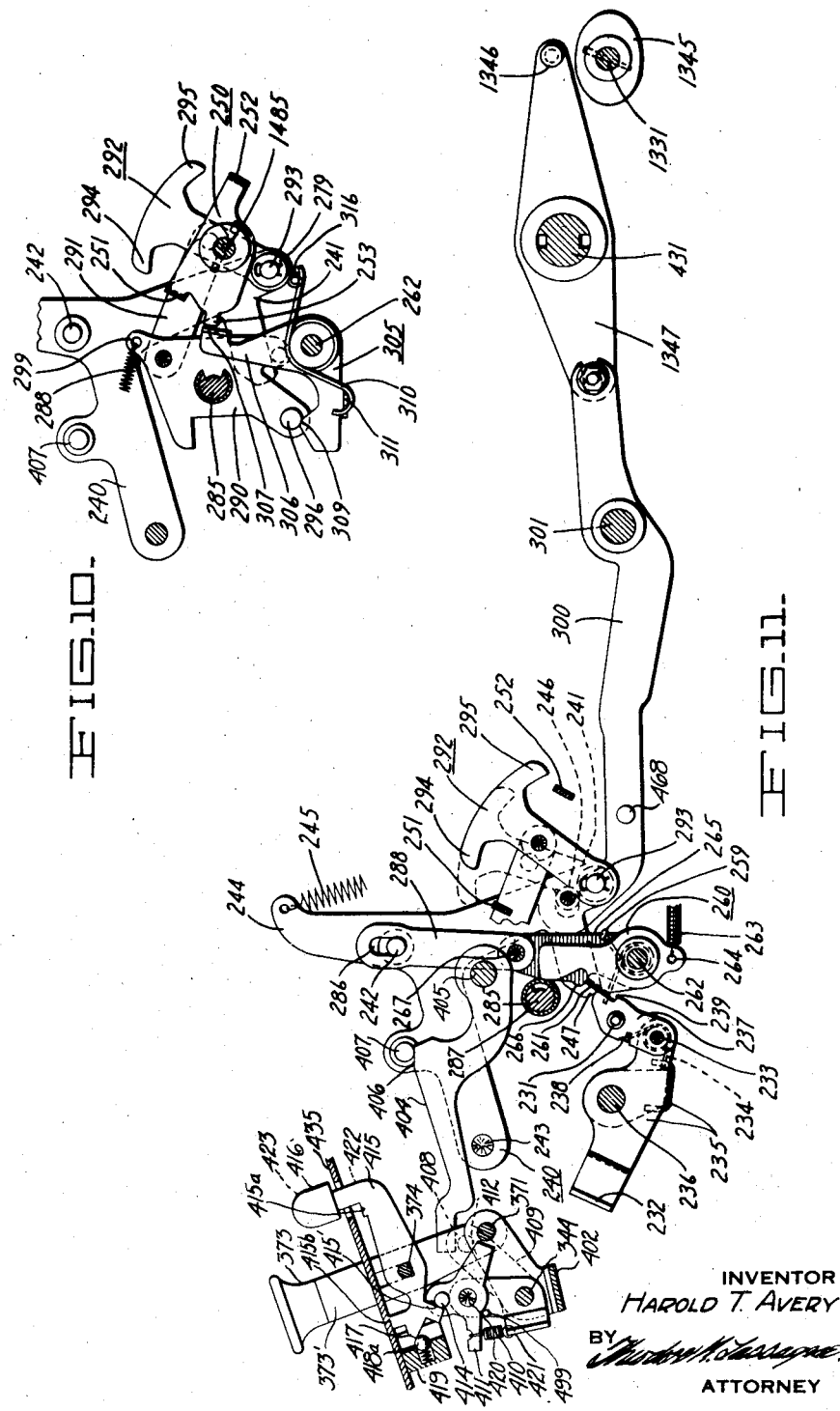
INVENTOR
HAROLD T. AVERY
BY
ATTORNEY

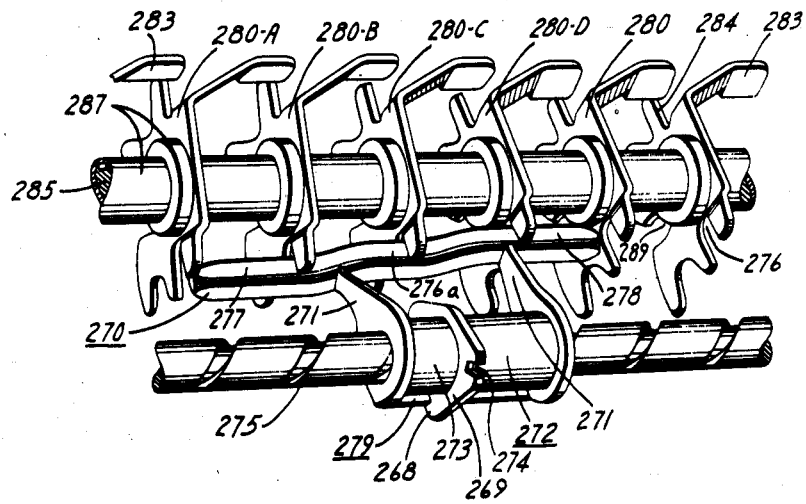
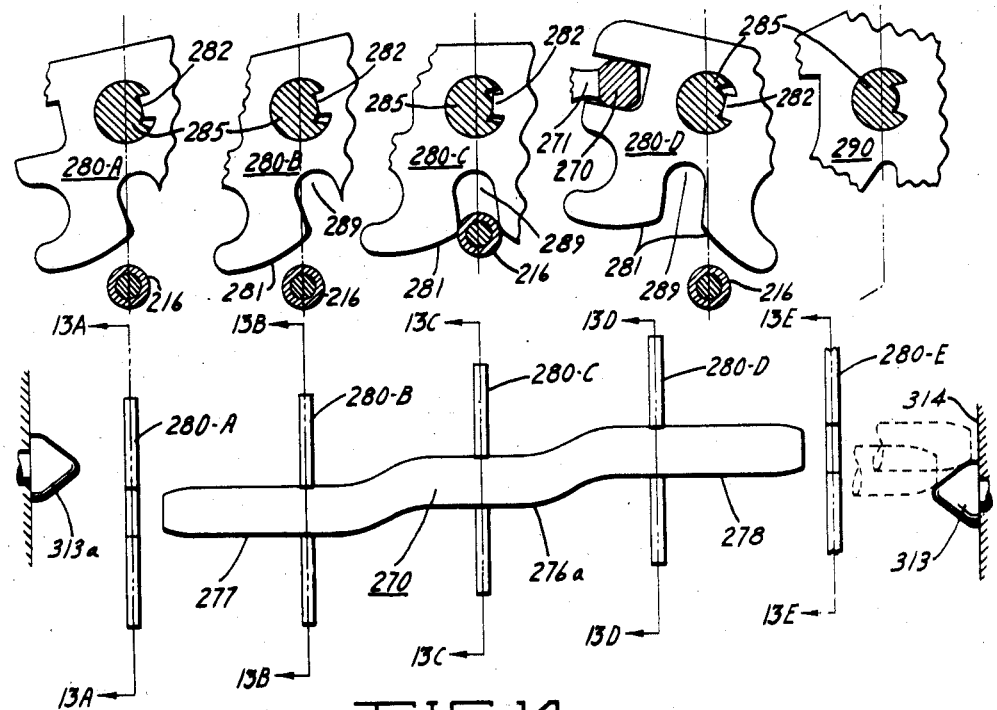

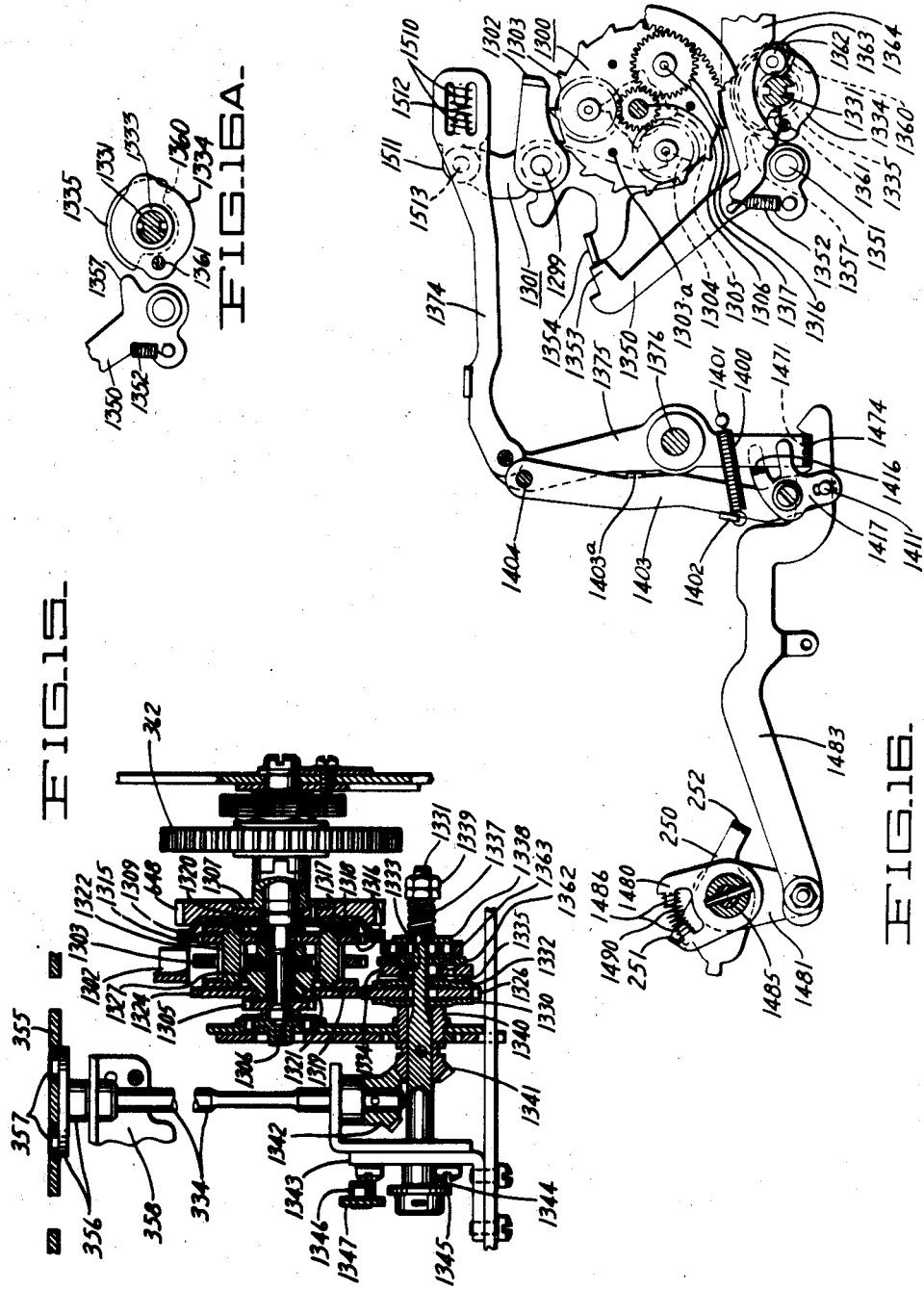

Sept. 8, 1942.  H. T. AVERY  2,294,948
CALCULATING MACHINE
Filed April 29, 1940  9 Sheets-Sheet 7
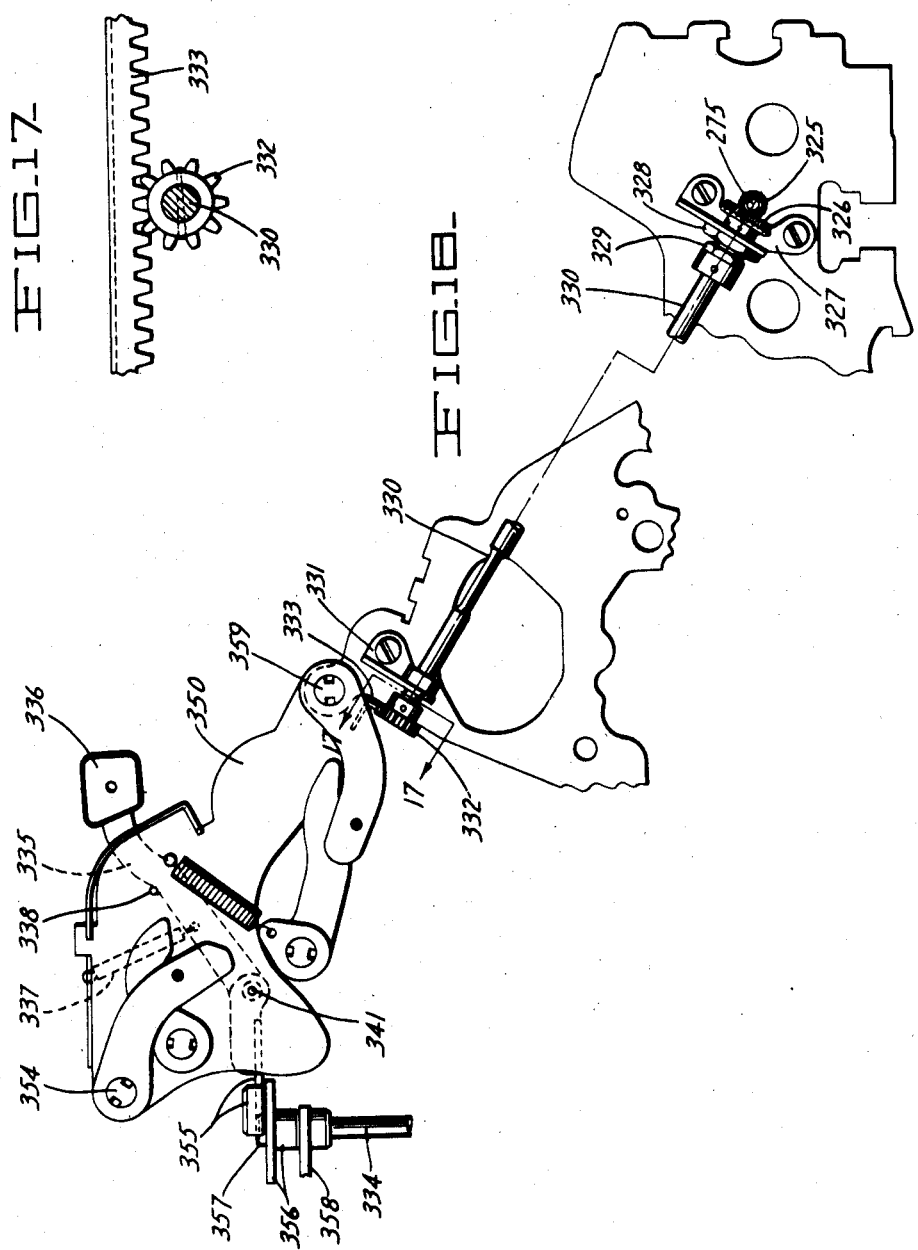
INVENTOR
HAROLD T. AVERY
BY
ATTORNEY

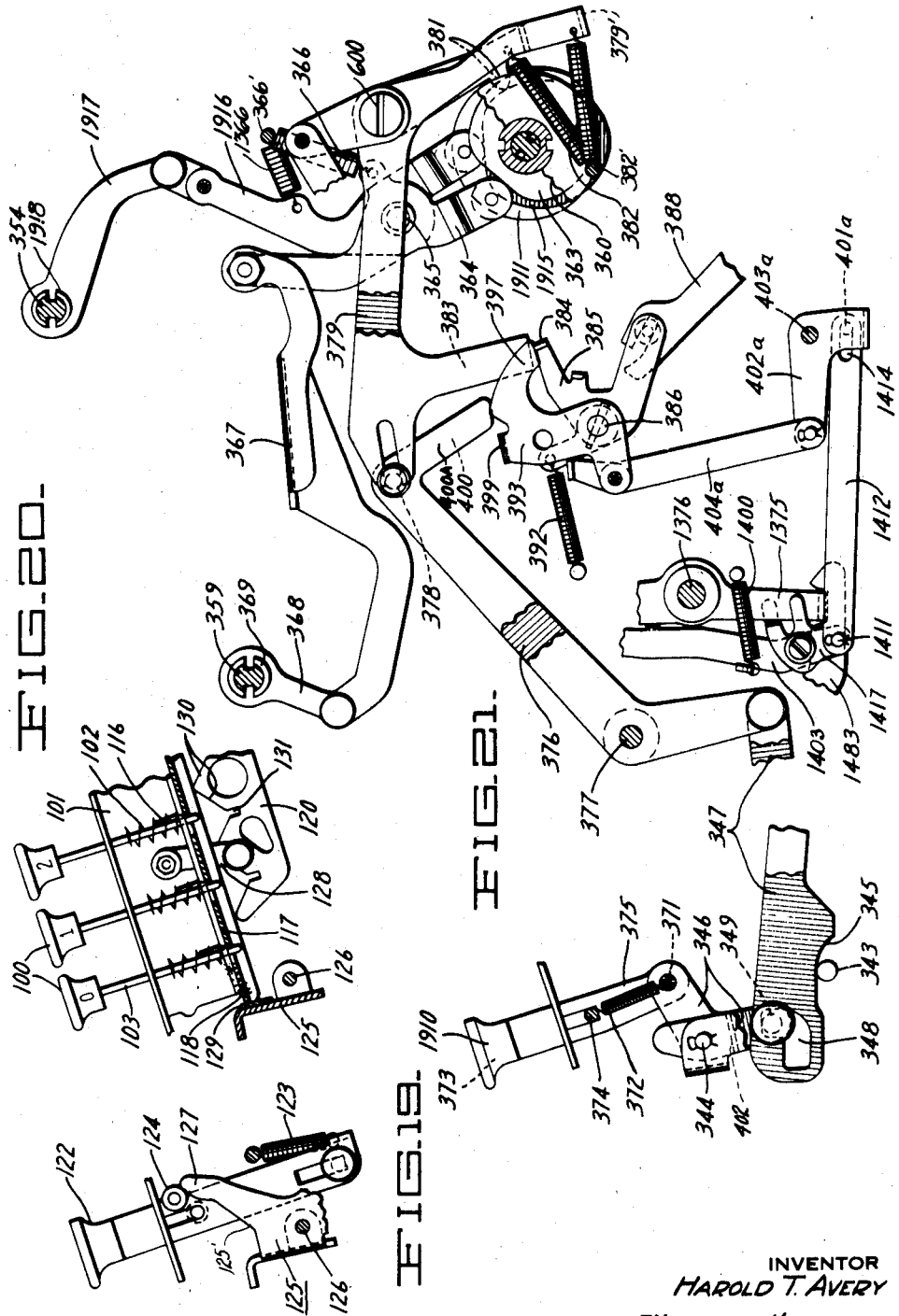

Sept. 8, 1942.  H. T. AVERY  2,294,948
CALCULATING MACHINE
Filed April 29, 1940  9 Sheets-Sheet 9
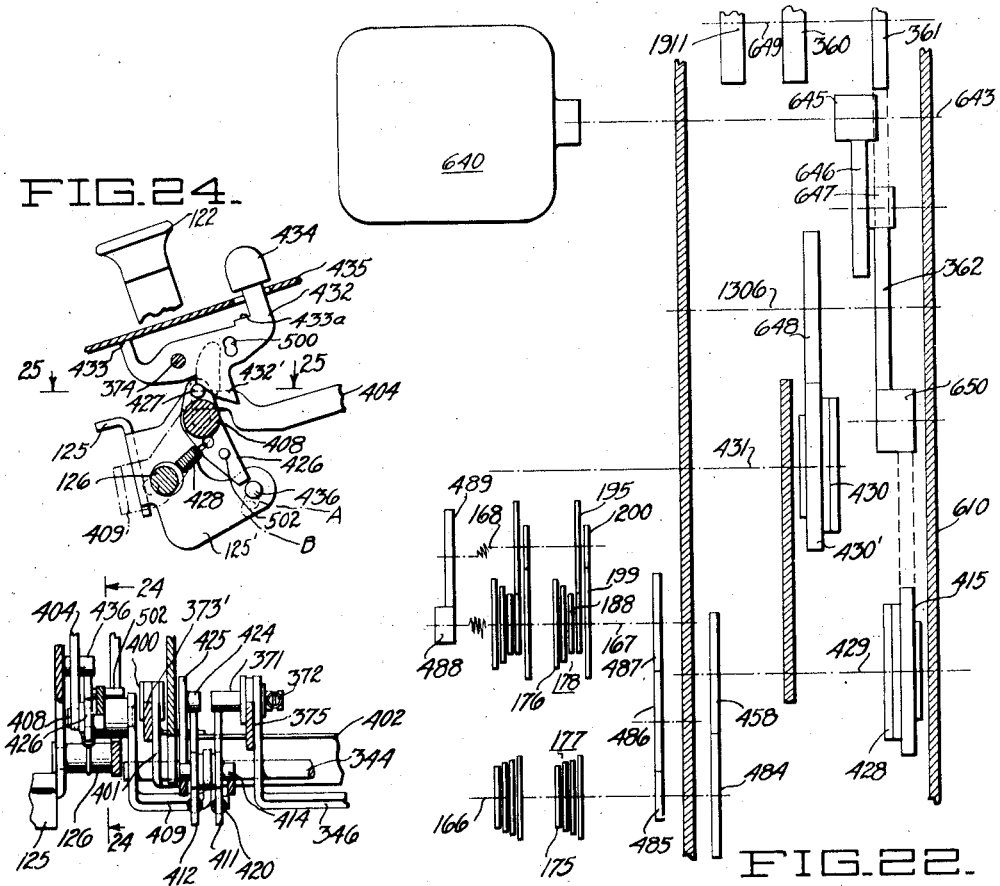
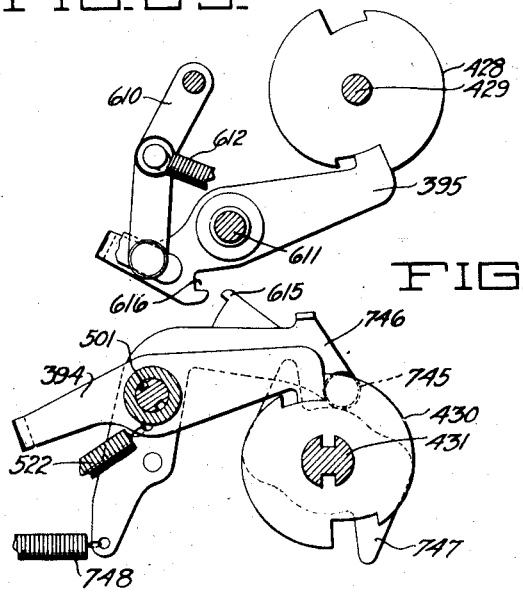
INVENTOR.
HAROLD T. AVERY
BY
ATTORNEY.

Patented Sept. 8, 1942

2,294,948

UNITED STATES PATENT OFFICE 2,294,948

CALCULATING MACHINE

Harold T. Avery, Oakland, Calif., assignor to Marchant Calculating Machine Company, a corporation of California Application April 29, 1940, Serial No. 332,221

12 Claims. (Cl. 235—145)

This invention relates to calculating machines, and has particular reference to the type having a carriage shiftable into different operating positions.

The present invention is disclosed herein in its preferred form as embodied in a machine of the type shown in the Patent No. 2,271,240, granted January 27, 1942, on the copending Avery application, Serial Number 84,927, filed June 12, 1936, including tabulator mechanism of the type shown and claimed in the copending Avery application Serial Number 213,195, filed June 11, 1938, to both of which reference is had for a complete disclosure of the calculating machine, including mechanism not specifically disclosed herein. It is to be understood, however, that the invention is not to be regarded as limited to application to machines or mechanisms of the type set forth in the above applications. For example, although the invention is shown applied to a machine in which the shiftable carriage supports registers for movement relative to actuating mechanism therefor, certain features of the invention will also be useful in calculating machines wherein the registers are stationary and the actuating mechanism is shiftable relative to the registers.

It is the general object of the present invention to facilitate manual control of different power-operated mechanisms of a calculating machine.

A more specific object of the invention is to reduce the number of manual operations required after one machine calculation to condition the calculating machine for a subsequent calculation.

Another object of the invention is to preselectively adjust an operating mechanism to subsequently operate any of a plurality of machine control devices.

A further object of the invention is to enable a value selecting key to control operation of means for normalizing the keyboard and registering mechanisms of a calculating machine after a calculation operation.

Another object of the invention is to enable the first of a plurality of value selecting keys depressed to control operation of such normalizing mechanisms and to thereafter automatically disable such control.

With a machine embodying the present invention it is possible to reduce the amount of time and effort required on the part of the operator in conditioning a calculating machine for a problem, by reducing the number of controls which must be manipulated by the machine operator. For this purpose, the devices for resetting or clearing the registers are automatically controlled, the carriage being moved to a predetermined position and the register or registers reset automatically upon setting of one of the value selecting keys. Thus after a calculation has been completed on the machine, the machine operator need only start setting the various value selecting keys for the next problem. Upon depression of the first such key operation of the register resetting devices and the mechanism for moving the carriage to a desired position is automatically initiated.

The manner in which the above and other objects of the invention are accomplished will be readily understood on reference to the following specification when read in conjunction with the accompanying drawings wherein:

Figure 2 is a longitudinal sectional view, as viewed from the right side of the machine, embodying the present invention.

Figure 3 is a transverse sectional view through two of the key sections and is taken along the line 3—3 of Figure 2.

Figure 4 is a longitudinal view, partly in section, as viewed from the right side of the machine, with parts broken away to show details of the tabulator key section and portions of the mechanism controlled thereby.

Figure 5 is a sectional view, taken on the line 5—5 of Figure 4, showing details of interlocks between the tabulator key stems.

Figure 6 is a sectional view, from the right, showing details of a mechanism provided to initiate a carriage shift.

Figure 7 is a sectional view, from the right side of the machine, showing details of a trip latching mechanism.

Figure 8 is a sectional view from the right showing details of the tabulator mechanism.

Figure 9 is an enlarged sectional view taken on line 9—9 of Figure 7.

Figure 10 is a sectional view taken from the right, showing details of the mechanism for controlling the direction of the shift, and related mechanism.

Figure 11 is a longitudinal sectional view taken from the right, showing portions of the carriage shift controls and register resetting control devices.

Figure 12 is an enlarged perspective view of portions of the tabulator control mechanism.

Figure 1:
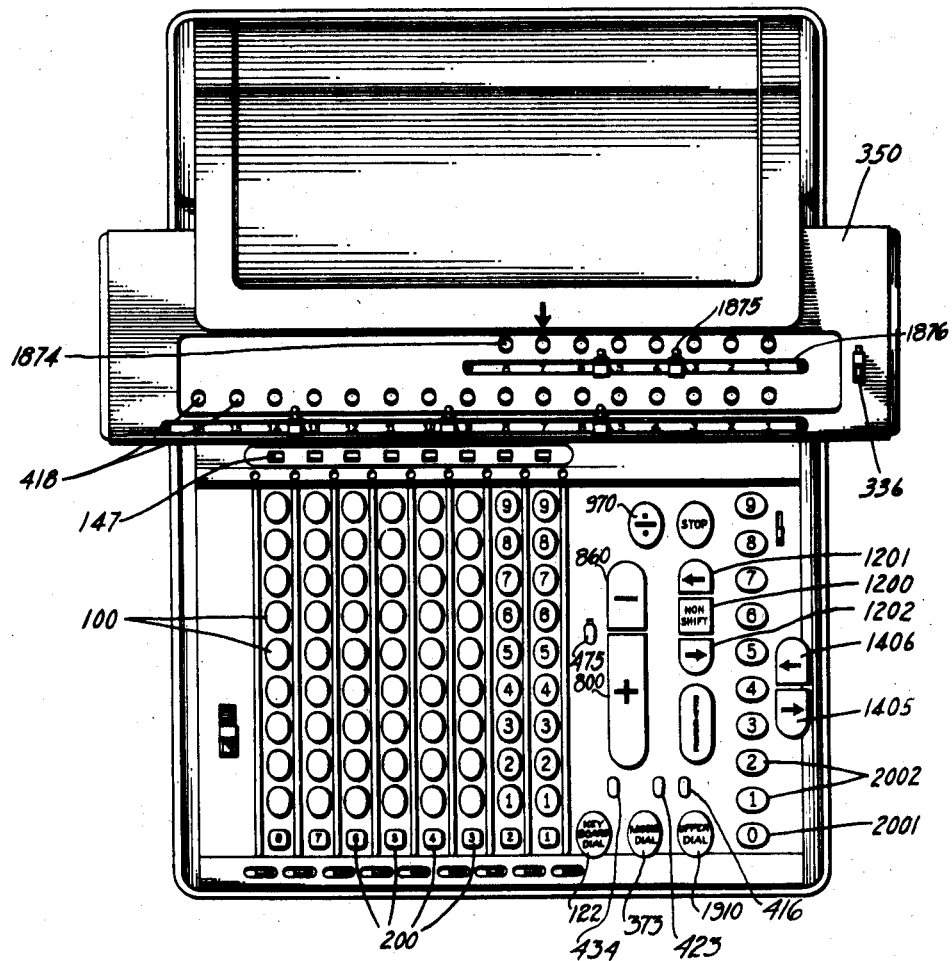
Figure 1 is a plan view of a calculating machine embodying the present invention and showing the location of the various control devices.

Figures 13A to 13E, inclusive, are schematic sectional views taken along correspondingly numbered lines 13A to 13E, inclusive, of Figure 14, showing the several positions of the control levers in relation to the shaft to which they are keyed.

Figure 14 is a schematic view showing the relation of the control levers to the tabulator controller and the means for stopping the shift when the carriage reaches its extreme end positions.

Figure 15 is a sectional view of details of the planetary shift clutch and its connection to the carriage.

Figure 16 is a view, in elevation, of the right side of the planetary shift clutch and its control linkage.

Figure 16A is a detail view of portions of the carriage shift controls.

Figure 17 is a detailed sectional view taken on the line 17—17 of Figure 18.

Figure 18 is a fragmentary view, in elevation, from the left side of the machine, showing portions of the tabulator controls.

Figure 19 is a detail view, from the right, of the keyboard dial clear key and its associated clear bail.

Figure 20 is a detail view in section, taken from the right, showing the clear bail and means for releasing the numeral keys of the keyboard.

Figure 21 is a fragmentary view in elevation, from the right, of portions of the register clearing mechanisms.

Figure 22 is a schematic view showing various driving connections.

Figure 23 is a detail view of certain clutch mechanisms.

Figure 24 is a detail view, from the right, of portions of the keyboard clear controls.

Figure 25 is a sectional plan view of details of the various resetting or clearing devices and is taken along the line 25—25 of Figure 24.

*Manually set selection mechanism*

The present invention is disclosed as embodied in a machine commercially known as the "Marchant" calculating machine, which is of the key-set type in which means are provided for first setting one factor of a calculation upon a keyboard and subsequently operating the machine in a manner indicated by the character and amount of another factor of the calculation.

The mechanism for setting up the first factor may be considered as comprising a manually operated and a power portion, the manually operated portion being designed to be moved to a selected controlling position by the depression of keys, and the power operated portion being designed to be brought into operation by control keys and to operate the various calculating mechanisms under the control of the manually set mechanism.

As viewed in Figure 1, the various value selecting keys 100 are arranged in a series of banks of nine keys each, the number of such banks provided depending upon the magnitude of the factors with which the machine is designed to deal. Each key bank comprises a channel shaped key frame 101 (Figures 2 and 3) in which the key stems 103 of the various keys 100 are slidably mounted. Compression springs 102 are provided to normally maintain all of the keys 100 in a raised position.

All of the key stems 103 are of the same length and each has a cam extrusion 116 which, upon depression of the associated key, pushes to the right, as viewed in Figure 2, a slotted key locking slide 117, slidably supported on the lower side of the channel 101 by rivets 104, thereby releasing any other latched down key in the same key section. Upon full depression of any value key stem, the slide 117 is returned to its initial location by spring 118 and by overlying the upper end of the extrusion 116 latches the depressed key.

Disposed underneath the value keys 100 is a differentially settable bar 120 (Figure 2) which is pivotally suspended from the key-section frame 101 by means of two parallel links 128 and 129. This bar 120 has nine identical divergent notches 130, each of which terminates in a rectangular slot 131 proportioned to receive the end of key stem 103 so that the bar 120 will be accurately positioned thereby. The key stems 103 are spaced an equal distance apart and this distance is slightly greater than the spacing between successive slots 131 so that each succeeding slot 131 will be spaced one increment further away from its cooperating key stem. Thus, depression of a value key will cam the bar 120 to the right a number of increments equal to the value represented by the depressed key.

Such movement of each of the bars 120 is utilized to set up a mechanical representation of the selected value to control the calculating mechanism accordingly and for this purpose, a swinging segment member 132 is connected by means of a pin and slot connection 163 to each bar 120, and is pivotally mounted on a common shaft 137 extending across the machine and supporting like members associated with other key banks. Each of these segment members 132 is provided at opposite ends thereof with arcuate racks 138 and 139 which serve to transmit the movement of the differential bar 120 respectively, through a pinion 145 to a check dial assembly 140 rotatably mounted on a shaft 141 and through a gear 151 to a cam unit 146 which is positioned by such movement to form a mechanical representation of the value set up on the associated key bank.

Each cam unit 146 comprises a gear 151 and five cams, one of which is shown at 152. Each one of the cams has two high points 160 and two low points 161 on its periphery. The cams are so staggered that no high or low point on one cam is aligned with a high or low point on another cam.

As described in detail in the above mentioned Avery Patent No. 2,271,240, the various cams on the cam unit 146 are so arranged that upon depression of a value key 100, the gear 151, meshing with the arcuate rack 139, will rotate the cam unit 146 to a position wherein one of the high points of one of the cams will be positioned in the path of a nose 1211 of one of a set of five feeler arms 1210 on one side of the cam unit 146, or in the path of a nose 1219 of one of a set of five feeler arms 1217 on the opposite side of the unit 146.

*Power set selection mechanism*

After the setting of the mechanism heretofore described has been completed and upon manipulation of one of the operation control keys, the power operated portion of the machine is brought into operation and acts under the control of the cam units 146 to effect entry of a value set up on the keyboard into the accumulator register. Since this power operated mechanism is disclosed in detail in the above mentioned Avery Patent No. 2,271,240, only a brief description of the function of this mechanism is deemed necessary.

Upon depression of one of the operation control keys, such as the add key 800, the subtract key 860, the division key 970, or one of a plurality of multiplication control keys 2002 (Figure 1) a setting clutch dog 394 (Figure 23) is rocked by suitable mechanism (not shown) to effect engagement of a cyclically operable setting clutch 430, the details of which are also disclosed in the above Avery patent.

Upon engagement of the setting clutch 430, power derived from a driving motor 640 (Figure 22) is transmitted through a train of elements, including gears 645, 646, 647, 362, the latter of which is suitably connected to a gear 648 meshing with a gear 430', through the setting clutch 430 to a setting shaft 431.

Keyed on the setting shaft 431 are a number of pairs of complementary cams identical to cams 1220 and 1221 (Figure 2) and each such pair has an associated cam follower 1224 pivoted on a cross shaft 1225 and provided with a roller 1222 in engagement with the cam 1220 and a second roller 1223 in engagement with the cam 1221. As the shaft 431 rotates the cam followers 1224 are rocked in a clockwise direction and, through links 1226, impart a counter-clockwise rocking movement to a series of levers 1214 rockably mounted on a shaft 301.

A shaft 1213 supported by the levers 1214 has pivotally mounted thereon the groups of feeler arms 1210 hereinbefore described, one of these groups being located adjacent each of the cam units 146. During the leftward movement of the feeler arms 1210 by the shaft 1213, each of the noses 1211 formed on the feeler arms 1210 engages the periphery of its respective cam on the cam unit 146, thereby causing each feeler arm 1210 to pivot about the point of contact between its respective nose and the periphery of its associated cam. The balance of the forward movement of the shaft 1213 by the cam followers 1224 effects forward movement of the lower end of the feeler arms 1210 and this movement is transmitted through a link 1216 to rock a second feeler arm 1217 aligned with each of the feeler arms 1210. The arms 1210 rock in a clockwise direction about a fixed shaft 1218 until their noses 1219 engage the periphery of the respective cam at a point substantially diametrically opposite that engaged by the nose 1211 of the associated feeler arm 1210.

As was described hereinbefore, each of the cam units 146 is so arranged that only one of the associated pairs of feeler arms 1210 and 1217 will have their respective noses in engagement with the high or low points of a cam at any one setting of the value keys 100 in the respective key section. Thus, one of the feeler arms 1210 will be rocked a considerable angle about its supporting shaft 1213 to one side or the other of a medial position, depending upon whether its nose 1211 is in engagement with a high point 160 or a low point 161 of its respective cam. All of the other cams in the cam unit will, since their noses are held the same distance apart from the cam supporting shaft 159 by the remaining cams, be held in their respective medial positions causing their upper slotted ends to assume a position substantially as shown in Figure 2.

Each of the feeler arms 1210 is connected through a pin and slot connection 1206 with a plate 172 pivoted on a shaft 170, and arranged on each plate is a set of gears 174 and 173, meshing with a laminated gear 189 rotatably mounted on shaft 170.

From the above it will be seen that four of each group of five of the selection plates 172 will be held in a medial position substantially as shown in Figure 2, while the fifth will be moved forward or rearward until the lowermost gear 173 thereon meshes with an aligned gear 175 on a shaft 166 or an aligned gear 176 on a shaft 167.

Gear 175 is one of a group of four gears 177 (Figure 22) keyed on shaft 166, and adapted to mesh with gears on four of the selection plates 172. Likewise, gear 176 forms one of a group of five gears 178 mounted on the shaft 167 and adapted to mesh with gears on the five selection plates 172. The three leftmost gears of this latter group are keyed to the shaft 167, while the two rightmost gears 188 and 199 are free on the shaft 167 and mesh with gears 195 and 200, respectively, keyed on a third shaft 168.

The shafts 166, 167, and 168 are connected to the motor 640 (Figure 22) in a manner described hereinafter, so that shaft 166 rotates through 180° for each cycle of operation of the machine, and shaft 167 rotates through 90° for each cycle of operation of the machine, while shaft 168 moves through 30° for each cycle of operation. The diameters of the various gears in the two gear groups 177 and 178, corresponding to each keyboard order, are so arranged that for each machine cycle, the gear 189 (Figure 2) will be rotated by one of the gears of the groups 177 and 178, a number of increments corresponding to the value of a key 100 which is depressed during a machine cycle. If no key is depressed, the selection plates 172 will be so arranged that none of the gears of groups 177 and 178 will become operative to drive the gears 173.

At the start of a machine cycle, and in advance of rotation of the gears 189, a gear 1271, having a gear 1273 of the accumulator register meshing therewith, is dipped under control of the setting shaft 431 by means (not shown) to mesh with the gears 189 and thereby transmit rotation to a numeral dial of the accumulator register visible through an opening 418 (Figure 1) in the carriage order. Suitable tens carry mechanism (not shown) is provided as disclosed in detail in the above mentioned Avery Patent No. 2,271,240.

As was mentioned hereinbefore, the various gears on shafts 166, 167, and 168 are adapted to be driven by the motor 640 (Figure 22) and for this purpose a cyclically operable main clutch diagrammatically illustrated at 428 in Figures 22 and 23 is provided to control rotation of the shaft. Clutch 428 is entrained with the hereinbefore mentioned drive gear 362 through a pinion 650 and a gear 450 connected to the driven side of the clutch 428. During each cycle of the operation of the clutch 428 (one-half revolution thereof) a one-half revolution is transmitted to a shaft 429 and this rotation is, in turn, transmitted through a reversible transmission (not shown), through gears 458 and 484, to the shaft 166. The shaft 167 is entrained with the shaft 166 through gears 485, 486, and 487, while the shaft 168 is entrained with the shaft 167 through gears 488 and 489.

Initiation of operation of the main clutch 428 is controlled by the setting clutch 430, and for this purpose a cam 747 (Figure 23) is keyed on the setting shaft 431 and engages a roller 745 carried by a cam follower 746 pivotally mounted on a shaft 501 and urged into engagement with the cam 747 by a tension spring 748. After the various feeler arms 1210 and 1217 and the selection plates 1072 have been positioned under control of the complementary cams 1220 and 1221, the cam 747 engages and rocks the cam follower 746 counter-clockwise enabling a tip 615 carried thereby to engage a notch 616 formed in a main clutch dog 395 pivoted on a shaft 611 and normally held in engagement with the main clutch 428 through a toggle link arrangement 610 and tension spring 612. As the cam follower 746 causes the tip 615 to engage and rock the dog 395 out of engagement with the clutch 428, this clutch couples the shaft 429 with the continuously driven gears 415 and thus effects actuation of the various actuator gears 177 and 178.

At the end of a machine cycle (one-half revolution of the main clutch 428) during addition or subtraction operations, the spring 612 causes the dog 395 to again engage the clutch 428 and thereby uncouple the shaft 429 from the gear 415. However, during other calculations such as division and multiplication, the dog 395 is held from engagement with the clutch 428 by mechanism (not shown) until completion of the proper number of cycles of operation as controlled by the automatic control mechanisms disclosed in the Avery Patent No. 2,271,240 referred to hereinbefore.

*Carriage shifting mechanism*

The controlling mechanism embodying the present invention to be hereinafter described is designed to control carriage shifting mechanism of the type used in the commercially known "Marchant" calculating machine. It is therefore desirable to give a brief description of the operation of this carriage shifting mechanism before an explanation of the novel controls.

As shown in Figure 15, the hereinbefore mentioned motor driven gears 362 and 648 are rotatably mounted on the shaft 1306, the latter gear being mounted on a flange 1307 which is keyed to the hub of the gear 362. Gear 648 has secured thereto a dished supporting disc 1309 to which is welded an internal gear 1315. Gear 1315 is in mesh with three equi-spaced planetary gears 1316 (Figures 15 and 16) riveted to each of three shafts 1317, respectively, which extend through clearance holes provided in a ratchet wheel 1303 and have end bearings in plates 1318 and 1319. These plates and the ratchet wheel 1303 are secured together as a rigid unit by studs 1303a. The planetary gears 1316 also mesh with a sun gear 1320 formed at one end of a sleeve 1321 to the opposite end of which is suitably keyed a second ratchet wheel 1305. Both sleeve 1321 and the ratchet wheel 1305 are journaled on the shaft 1306.

Gear teeth 1322 are formed on each shaft 1317 and these mesh with a second sun gear 1327 to which is secured a gear 1324 meshing with a gear 1326 rotatably mouned on a shaft 1331. This latter gear is held between a pair of friction discs 1330 and 1332 which are keyed to a shaft 1331, the latter disc being pressed against gear 1326 by a compression spring 1337.

Interposed between the compression spring 1337 and the friction disc 1332 are a disc 1335 keyed to shaft 1331, a sleeve 1333, a second disc 1362 also keyed to the shaft 1331 and supporting a pair of diametrically opposed rollers 1363, and a washer 1338. A pair of lock nuts 1339 are adjustable along the threaded end of shaft 1331 to regulate the amount of friction applied between the gear 1326 and its friction discs 1330 and 1332.

The shaft 1331, driven by the reversible gear transmission through the gear 1326, is journaled in a bearing 1340 and in a second bearing 1344 supported by a bearing bracket 1343. A beveled gear 1341 secured on the shaft 1331 meshes with a second bevel gear 1342 fixed on the lower end of a vertical shaft 344. This shaft is journaled in bearings provided in brackets 358 and 1343, and has fixed at the upper end thereof a hub and plate assembly 356 on which are mounted rollers 357 adapted to engage between the teeth of a rack 355 (Figures 15 and 18) mounted on the shiftable carriage 350. Thus, upon rotation of the assembly 356 by the planetary transmission mechanism, the rollers 357 engage the rack 355 and shift the carriage 350 laterally either to the left or to the right depending upon the direction of rotation of the shaft 334.

The shaft 1331 may be selectively rotated in either direction to effect a shift of the carriage 350 either to the right or to the left by holding one or the other of the ratchet wheels 1303 and 1305 from rotation, depending upon the direction of carriage shift desired. If the ratchet wheel 1303 is held, rotation of the planetary gear 1316 about the sun gear 1320 will be prevented and the planetary gears will function as idlers to transmit rotation from the internal gear 1315 driven by the gear 362, to their integrally connected gears 1322 to the sun gear 1327, whereby the gear 1324 will be rotated in one direction. If, however, the other ratchet wheel 1305 is held, thereby holding stationary the gear 1320 integrally attached thereto, the rotation of internal gear 1315 will feed the planetary gears 1316 about the fixed sun gear 1320 with which they mesh, thereby causing them to rotate on their own centers and also to rotate about the sun gear 1320, thereby driving the gear 1324 in an opposite direction.

To effect such selective shifting of the carriage, a clutch member 1301 (Figure 16) pivoted on a stud 1299 is provided. The member 1301 has a pair of latch dogs 1302 and 1304 extending therefrom, the former being adapted to engage and hold the ratchet wheel 1303 from rotation when the member 1301 is rocked in a clockwise direction, as viewed in Figure 16, while the latter dog 1304 is adapted to engage and hold the ratchet wheel 1305 against rotation when the member 1301 is rocked in a counter-clockwise direction. If the clutch member 1301 is held in a neutral position, as illustrated in Figure 16, wherein neither of the dogs 1302 and 1304 is engaged, the differential merely idles and there is no drive to the shifting mechanism.

Means are provided whereby either of the dogs 1302 and 1304 is held in engagement with its respective ratchet wheel during approximately the first three-quarters of a shift cycle to positively insure the completion of any initiated shift regardless of how soon the control member 1301 is urged toward its neutral position after having once been moved to shift controlling position. On a leftward extension of the clutch control member 1301 (Figure 16) is a laterally extending ear 1354 adapted to be engaged with either the top or bottom surfaces of a projection 1353 formed on a latch member 1350, said latch member being pivotally mounted at 1351 and urged toward engagement with the ear 1354 by a spring 1352 (Figure 16 and Figure 16A). When the control member 1301 is rocked either clockwise or counter-clockwise from its neutral illustrated position, the projection 1353, normally held in the position shown by the ear 1354, will snap into latching position either above or below the ear 1354 under tension of the spring 1352 and thereby latch the clutch member 1301 against return movement into its neutral position until the shift has progressed through approximately three quarters of its current cycle, at which time it will be released by the latch member 1350.

Provision is made for additionally tensioning the spring 1352 during the first portion of the shift cycle, and for this purpose a centralizer 1364 (Figure 16) is utilized, the upper end of spring 1352 being attached to the extreme left hand end thereof. The centralizer 1364 is pivotally supported at its right hand end (not shown) and is held in engagement with the two diametrically opposed rollers 1363 by the spring 1352. When the shaft 1331 starts to rotate at the beginning of a shift cycle, one of the rollers 1363 carried on the disc 1362, which is keyed to the shaft 1331, cams the centralizer 1364 upwardly thereby increasing the tension of the spring 1352 and insuring latching engagement of the projection 1353 with the clutch member 1301.

Provision is made for moving the latch member 1350 from latching engagement with the clutch member 1301 upon completion of approximately three-quarters of the shift cycle. For this purpose, a cam 1334 (Figures 16 and 16A) having a pair of diametrically opposed lobes formed thereon is rotatably mounted on the sleeve 1333 and is driven by the disc 1335 keyed to the shaft 1331 so as to cam a nose 1357 formed on the lower end of the latch member 1350 at the end of approximately three-quarters of a shift cycle.

To insure the same cyclic time of operation of the latch member 1350 for reverse rotation of shaft 1331, the disc 1335 is provided with two shoulders 1360 disposed approximately 180° apart so that a pin 1361 secured on the cam 1334 will, upon clockwise rotation of the shaft 1331, be engaged by the shoulder 1360 on the opposite side of the disc 1335 (Figure 16A) only after the disc has been rotated about three-eighths of a revolution (which is three-quarters of a cycle.)

Although the drive to the carriage to the shift mechanism is thus terminated at approximately three-quarter cycle position, the shift drive train will be rotated through the remainder of its cycle by the centralizer 1364 which is pressed by spring 1352 against rollers 1363 on disc 1362 secured to said shaft. In addition to completing the shift cycle, the centralizer 1364 and rollers 1363 also serve to restrain any movement beyond the end of the cycle so that the carriage will always come to rest in an operating position.

Means are provided for rocking the clutch member 1301 into either of its two shift controlling positions to effect a rightward or leftward carriage shift. This means comprises a shaft 1485 (Figure 16) having fixed thereto a lever 1480 provided with two spaced lugs 1486. A second lever 1481, also having two spaced lugs 1486 identical with those on the lever 1480, is freely mounted on the shaft 1485 in juxtaposition with the lever 1480. A spring 1490 is compressed between the four lugs 1486 thereby forming a yieldable connection between the levers 1480 and 1481, by means of which a rocking motion may be transmitted from the shaft 1485 to the lever 1481.

The lower end of lever 1481 is attached to the left end of a link 1483 so that the rocking of shaft 1485 imparts a longitudinal movement to the link 1483. This link is provided with a notch 1474 on the right end thereof which embraces a lateral extension 1471 formed on the lower end of a lever 1375 pivotally mounted on a shaft 1376. The upper end of lever 1375 is pivoted to a link 1374 which has at its rear end an aperture in which extends two spacing lugs 1510. In juxtaposition with the rear end of the link 1374 is another but shorter link 1511 with an identical aperture, also with two facing lugs 1510. Links 1374 and 1511 are yieldably connected together by a compression spring 1512 located over the four lugs 1510. This link 1511 is pivotally connected at its forward end to the clutch member or dog 1301 by a stud 1315.

Provision is made for returning the clutch member 1301 to its neutral illustrated position when not restrained in shift controlling position by the latch member 1350, or means described hereinafter, by a centralizer 1403 which is pivotally mounted on the machine frame at 1404. A lug 1403a extends laterally from the centralizer 1403 into engagement with the lever 1375 above the shaft 1376, while an adjustable lug 1417 having an offset 1416 is mounted on the lower end of the centralizer 1403 and engages the lever 1375 below the shaft 1376. A tension spring 1400 extends between the lateral extension 1402 and a stud 1401 on the machine frame to urge the centralizer against the lever 1375. Thus, the centralizer 1403 tends to maintain the lever 1375 in a neutral position in which the clutch member 1301 will be ineffective, and will return it to this neutral position automatically upon release of the latch 1350, providing the shaft 1485 is free to be rocked by the lever 1481.

The carriage may be released from the carriage shifting mechanism above described to enable manual traverse thereof, by rocking the rack 355 (Figure 18) about a supporting shaft 341 therefor, upwardly out of engagement with the roller 357 on the assembly 356. An arm 335, extending from the rack 355 through a slot in the carriage cover, terminates in a knob 336 to facilitate manual release of the rack 355. A tension spring 337 extending between the arm 335 and the carriage cover normally maintains the arm 335 against a stop pin 338 so as to move the rack 355 in mesh with the rollers 357.

*Tabulator setting mechanism*

The machine shown in Figure 1 is one in which the carriage may be moved to eight different operating positions and, to facilitate shifting of the carriage to any of these eight positions, eight tabulator keys 200 (Figure 1) are provided. However, any number of operating positions with a corresponding number of tabulator keys may be provided depending upon the magnitude of the factors with which the machine is designed to deal. It is to be understood that the mechanism controlled by each tabulator selection key is duplicated in all orders of the machine so that only one order will be described in detail.

Aside from selectively initiating various dial clearance functions, as will be hereinafter described, the tabulator keys 200 have two primary functions; first, to position the tabulator controlling mechanism for a shift of the carriage in the correct direction; and, second, to initiate operation of the carriage shifting mechanism.

Each of the keys 200 (Figures 2 and 4) is mounted on the upper end of a key stem 201, which is slidably mounted in the key frame 101 provided to support the numeral keys 100. The bottom of the key stem 201 is positioned in contact with the top of a sub key stem 202 slidably mounted in a tabulator key frame 208, which is secured in the machine by two brackets 203 attached to the front frame plate of the machine.

A compression spring 204 normally holds each sub key stem 202 in a raised position unless it is latched down by a lug 209 located adjacent the lower end of the stem 202 (Figure 5), which is adapted to abut the under surface of slidable lock bar 213. A notch is formed in the stem 202 below the lug 209 and embraces a lateral extension 211 formed on a lever 215, which is rockably mounted on a shaft 236 so that downward movement of the sub stem 202 by depression of the respective tabulator key 200 will impart a counter-clockwise movement to lever 215. A roller 216 is riveted on the rearwardly extending arm of the lever 215 and is adapted to impinge one or the other of the divergent sides 281 of a tabulator control lever 280 and cam it to the position shown in Figure 4. The mechanism shown in this figure is that of an order in which the key 200 has been depressed and all parts are in the position they assume when the carriage has come to rest in the selected position.

Means are provided to latch the stem 202 in a partially depressed position until it is released by depression of another one of the series of tabulator selection keys 200. The lugs 209 (Figure 5) on the lower ends of the key stems 202 are provided with curved surfaces at the bottoms thereof to cam the lock bar 213 to the right against a compression spring (not shown) during the downward movement of a respective key stem 202 until the lug 209 passes underneath the lock bar 213, and thus allows this lock bar to spring back to a position overlying the top of the lug 209 to latch a particular key in its partially depressed position. As another key 200 is depressed, its corresponding lug 209 again cams the lock bar to the right, thus allowing any depressed key to be raised by its respective spring 204 (Figures 4), and the second key to be locked down in the same manner as the first.

Pendulum type interlocks 205 (Figure 5) are provided to prevent the simultaneous depression of two or more keys, and are attached to the tabulator key frame 208 by shoulder studs 206 so that these interlocks are free to rock about their respective studs. The key stems 202 are provided with arms 212 (Figure 4) to operate against shoulders 207 of the interlocks 205. As shown in Fig. 5, a key stem 202 has been depressed and the arm 212 thereof, in passing downwardly between two adjacent interlocks 205, has forced the interlock to the right thereof to rock counter-clockwise about its stud 206, and similarly has forced the interlock to the left thereof in a clockwise direction.

A representation of the desired position of the carriage having been set into the tabulator control mechanism by the depression of one of the keys 200, it is also necessary to set into said mechanism a representation of the present position of the carriage, and for this latter purpose a tabulator controller movable in time with the lateral shifting movement of the carriage is provided. Tabulator controller 270 (Figures 4 and 12) is riveted, or otherwise secured, to two rearwardly extending arms 271 of a bail 279 which is mounted on, and is free to rock and to move transversely on a worm shaft 275. Between the flanges of the bail 279, from which arms 271 are extended, is a bushing 273 freely rockable on shaft 275 and a nut 272 which engages the groove of the worm shaft 275. On one end of the nut 272 (Figure 12) is a flange 269, having a notch 274 formed on one side thereof, adapted to embrace an angle plate 210 (Figure 4), secured to key frame 208, thereby preventing rotation of the nut 272 with the shaft 275 and causing rotation of said shaft to effect transverse movement of the nut 272, the bail 279, and the controller 270.

Means are provided whereby movement of the carriage will drive the worm shaft 275 (Figures 12 and 18) at such a rate as will impart a lateral movement to the controller 270 proportionate to the movement of the carriage, but in the opposite direction; this opposite directional drive being necessary only because the number one tabulator selection key 200 is preferably situated at the extreme right side of the keyboard while the number one position of the carriage is at the extreme left. For this purpose a driving rack 333 (Figures 17 and 18) is attached to the carriage 350 and has downwardly protruding teeth adapted to engage a spur gear 332 fixed to the upper end of a shaft 330. Two brackets 331 and 327, secured to the machine frame, support the upper and lower ends of shaft 330, respectively, bracket 331 having a bearing fixed thereto, while the bracket 327 supports an adjustable thrust bearing 329, in which the lower end of the shaft 330 is journaled while a nut 328 permits adjustment of said thrust bearing to insure the correct engagement between a bevel gear 326 secured to the lower end of shaft 330 and a second bevel gear 325 fixed to the left end of worm shaft 275. This construction affords a positive drive from the carriage 350 to the worm shaft 275 and the correct timing thereof, and in viewing Figure 17 it will be seen that leftward movement of rack 353 imparts counter-clockwise rotation to gear 332, shaft 330, and bevel gear 326 (Figure 18), which in turn rotates bevel gear 325 in mesh therewith and its integral shaft 275 in a clockwise direction to ultimately produce a rightward movement of controller 270 (Figure 12).

The controller 270 (Figure 12) is so mounted as to permit it to rock a sufficient amount about its shaft 275 to freely follow the movement of control levers 280 as they are rocked about shaft 285 from one to another of their various displaced positions. Spaced projections 268 (Figure 4) are provided on the flange 269 of the nut 272 to serve as limit stops for the bail 279 connecting arms 271. The distance between the projections 268, however, is enough greater than the width of the bail to allow the required movement of the controller 270 and bushing 273 with respect to the nut 272 and member 269.

Shaft 285 (Figure 4) is provided with a wide keyway into which the narrower keys 282 of members 280 extend; said keys being sufficiently narrower than their keyway to permit limited rocking movement of each of the levers 280 with respect to shaft 285.

The controller 270 (Figures 12 and 14) extends laterally a sufficient distance to insure that it will always engage in the recesses 276 of at least three adjacent members 280, and has three steps of different elevation, 277, 276a, and 278 (Figure 14), by virtue of which it positively positions the control levers 280 engaged thereby at as great a stagger with relation to each other as the keyway of shaft 285 will permit (see Figures 13B, 13C, and 13D. Each lever 280 has a laterally formed ear 283 overlying a nose 284 on the next lever to the right in such a manner that when a lever is positioned clockwise as shown in Figure 13D, all those to the right of it are positioned equally far clockwise, and when a lever is positioned counter-clockwise as shown in Figure 13B, all to the left of it are positioned equally far counter-clockwise. Thus controller 270 serves to positively locate all levers 280 with respect to the keyway in shaft 285, the lever 280 engaged by the middle of controller 270 having its key located centrally of the keyway, all those to the right thereof against the lower side of the keyway and all those to the left against the upper side.

When a tabulator selection key 200 is depressed, a roller 216 (Figure 4) is moved upwardly to rock its respective lever 280 into a definite angular position, thereby rocking shaft 285 into a position determined by the angular relation existing between the lever 280 and the keyway in shaft 285, which in turn is determined by which side of the controller 270 the key is depressed.

In the present example, the lever 280C (Figures 13C and 14) aligned with the intermediate step 276a, of controller 270, has its key 282 located centrally in the keyway of shaft 285, and the lever 280B (Figure 13B) aligned with the lower step 277 has its key located against the top of said keyway, and the lever 280D (Figure 13D) in line with the upper step 278 has its key 282 located against the lower surface of the keyway in said shaft.

Figures 13A to 13E, inclusive, show control levers 280 positioned as they would be with the tabulator control sub key stem 202 in line with lever 280C (Figure 13C) latched down.

If the tabulator key in control of lever 280 positioned as shown in Figure 13A, hereinafter called order A, is now depressed, the roller 216 of order C will be retracted from lever 280C by the key stem 202 of order C being freed to rise under pressure of spring 204 as described hereinbefore, and the roller 216 of order A will press against the divergent side of 281 of control lever 280A to rotate said control lever clockwise about shaft 285.

Now in viewing lever 280A in Figure 12, which is from the left instead of the right as is the case of Figures 13A and 4, this setting movement of lever 280A forces its lateral extension 283 and arm 284 of lever 280B downwardly, which carries the controller 270 upward, thus rocking lever 280C and 280D counter-clockwise as viewed in Figure 12. Lever 280D (Figure 13D) represents the position of said lever before the setting occurred; therefore this upward movement of controller 270 just referred to, forces lever 280D further clockwise and the key 282 of said lever, being in the position shown in Figure 13D, rocks shaft 285 with it an equal amount.

If a tabulator key on the other side of controller 270 is depressed, for instance the one which controls order D (Figure 13D), the roller 216 of that order will be moved upwardly by said tabulator key, thereby rocking lever 280D counter-clockwise and forcing controller 270 downwardly, and in turn rocking levers 280C and 280D counter-clockwise. Since the key 282 of lever 280B (Figure 13B) is against the upper surface of the keyway of shaft 285, this counter-clockwise movement rocks said shaft an equal amount in a counter-clockwise direction, instead of clockwise as was the case in the previous example. Therefore, it is evident from the foregoing that the depression of a tabulator key on one side of the controller 270 rocks shaft 285 in one direction, but the depression of a tabulator key on the other side of said controller rocks shaft 285 in the opposite direction.

Fixed on the end of shaft 285 (Figure 10) by means of a key of the same width as the keyway of the shaft, is a right end control lever 290 connected by a link 291 with a T member 292 pivotally mounted at 293 on the main starting lever 240, the operation of which will be described hereinafter. As shaft 285 is rocked in one direction or the other, as just described, the T member 292 will be rocked about its pivot 293 to carry one of its upper arms 294 and 295 over one of the ears 251 and 252 of shift operating lever 250 which, as hereinafter described, effects operation of the carriage shifting mechanism in one direction or the other, according to the direction in which the member 292 is rocked.

Tabulator initiating mechanism

The direction in which the carriage must be shifted in order to reach the desired position having been automatically determined, means are provided for initiating operation of the shifting mechanism to move the carriage to a desired position. As previously described, the depression of a tabulator key 200 to the position shown in Figure 4 only conditions the tabulator mechanism for a shift to a selected position. Means are provided, however, whereby, a further depression of a key 200 (or depression of a value key 100 under certain conditions hereinafter described) will actually initiate tabulation.

It will be noted that the roller 216 of the lever 215 which has been moved to its illustrated position by setting of its respective tabulator key 200, is at the entrance of a slot 289 in the lever 280, having already positioned this lever. Therefore, when the key 200 is further depressed, the lever 215 is rocked further counter-clockwise and the roller 216 merely rises upwardly into the slot 289 without imparting further rocking movement to the control lever 280, but during this movement of the lever 215, its shoulder 217 contacts the side flange 231 of a bail 235 which is pivotally supported on a shaft 236. The bail 235 has a rearwardly extending arm formed thereon (Figures 6 and 8) to which is pivoted by a pin 233 a trigger 237. A torsion spring 234 extends around the pin 233 and has one end thereof fitted in a notch in the trigger 237 while the other end thereof extends through a hole in the rear flange of the bail 235 so as to urge the trigger 237 clockwise about pin 233. On the rear side of said link is the shoulder 239 adapted to engage the lower edge of a lateral extension 261 (Figures 6 and 11) of starting interponent 260 which is rockably mounted on a fixed stud 262 and urged to rock in a counter-clockwise direction by a spring 263 tensioned between an ear 264 on the lower end of the interponent 260 and a stationary stud (not shown), such movement being limited by the bushing 287 fitted on the shaft 285. The upper edge of the lateral extension 261 abuts a shoulder 266 (Figure 11) formed on a lower toggle link 265, also pivotally mounted on the stud 262. The upper end of the link 265 is pivotally attached to an upper toggle link 268 by a stud 267, this upper toggle link having an elongated hole 286 at its upper end which embraces a stud 242 on a starting lever 240.

The starting lever 240 is pivotally mounted on a fixed stud 243 attached to the frame of the machine, and is connected at the top of its upwardly extending arm 244 to one end of a tension spring 245, the lower end of which is securely fastened at a point (not shown) to the framing of the machine. The spring 245 thus tends to rock the starting lever 240 in a clockwise direction about the stud 243, but the lever 240 is normally restrained by the toggle link system comprising the upper and lower links 288 and 265, which, as illustrated in Figure 11, normally lie with the pivot pin 267 slightly to the left of center, with the upper end of the link 265 bearing against the sleeve 287 on the shaft 285.

When the tabulator bail 235 is rocked upon depression of a tabulator key 200 to its lowermost position, or upon depression of a value key 100, as will be described hereinafter, the trigger 237 is raised upwardly, and being held against the lateral extension 261 of the interponent 260 by the spring 234, rides along the surface of the extension 261 until its shoulder 239 abuts the lower edge of said extension, whereupon it rocks the interponent 260 clockwise about its stud 262. The extension 261 thus imparts a similar clockwise movement to the lower toggle link 265 (Figure 11), until the toggle link pin 267 is forced to the right of center, at which time the toggle link arrangement will collapse under the action of the tension spring 245, and the starting lever 240 will rock downwardly drawing with it the T member 292, which has been positioned over one of the ears 251 and 252, as previously described, so that said T member will contact one or the other of these ears of the operating lever 250 (Figures 7 and 16) to rock this lever and the shaft 1485 pinned thereto either clockwise or counter-clockwise, thus actuating the shift controlling mechanism to shift the carriage 350 in the manner described hereinbefore under the section entitled "Carriage shift controlling mechanism."

Means are provided to disable the tabulator starting mechanism when the carriage occupies a position indicated by a depressed tabulator key. On the lower section of the control lever 290 (Figure 8) is riveted a stud 298 engaging in the slot 321 of a tabulator disabling lever 320, said disabling lever being freely rockable on a fixed frame stud 262, and provided with a nose 322 adapted to engage a stud 231 riveted to the trigger 237. When the carriage occupies a position indicated by the depressed tabulator key, the shaft 285 and control lever 290 are in their neutral positions and hold the disabling lever 320 in the position shown in Figure 8, where its nose 322 lies in the path of movement of the stud 231. Now, as the bail 235 is rocked counter-clockwise in an attempt to initiate the tabulated shift, the trigger 237 is rocked counter-clockwise about its supporting stud 233 as the stud 231 rides over the nose of the disabling lever 320, thereby preventing contact of the shoulder 239 (Figure 6) of the trigger 237 with the lower edge of the ear 261 of the interponent 260. If the carriage is in any other position than that indicated by a depressed tabulator key, however, the shaft 285 and control lever 290, as previously described, will have been rocked clockwise or counter-clockwise, thereby rocking the disabling lever 320 and moving its nose 322 out of the path of movement of the stud 231, allowing trigger 237 to function normally to initiate a tabulated shift.

*Tabulator arresting mechanism*

Means are provided to arrest operation of the carriage shifting mechanism, thus initiated, when the carriage reaches the selected position. Referring to Figure 12, assume a shift has been initiated from order C to order A in the manner previously described, in which the lever 280A and shaft 285 will have been rocked counter-clockwise (viewing Figure 12 from the left); the control lever 280A being positively held by its roller 216 (Figure 4) and the shaft 285, being held in position by the difference in the three elevations of the steps of the controller 270, differentially positions the three levers 280 in contact therewith.

As the carriage and controller 270 traverse toward the controlling order (now order A) and the intermediate step 276a of the controller moves into the bifurcation 276 of control lever 280A, the controller 270 will be forced downwardly by the difference in the elevation of the steps 277 and 276a, and will rock all control levers 280 to the right and left of lever 280A clockwise, as viewed in Figure 12. The shaft 285 thus will be freed by the levers 280 to the right of lever 280A and positively rocked clockwise by the control levers 280 to the left of lever 280A. This rocking of shaft 285 back to neutral functions to arrest the tabulated shift in a manner to be described hereinafter.

In order to permit this movement of shaft 285 to arrest the shifting mechanism, however, it is necessary to first restore and recock the starting lever 240 and means are therefore provided to recock this starting lever (Figure 11) by power derived from the motor and transmitted through the shift clutch during the first cycle of its operation. On the downwardly extending arm 241 of the starting lever is riveted a roller 246 positioned to engage in the hook-shaped forward end of a lever 300 so that when starting lever 240 moves downwardly the lever 300 is rocked counter-clockwise about a shaft 301, and, in turn, rocks a cam follower 1347 clockwise about shaft 432 until roller 1346, riveted to the rear end of said cam follower, contacts the low surface of the cam 1345 which is secured to the shift jack shaft 1331 (Figure 15) and is rotated whenever the shift clutch operates. At approximately the same time the roller 1346 contacts cam 1345, said cam begins to rotate and rocks the cam follower 1347 counter-clockwise and lever 300 clockwise, thereby forcing starting lever 240 to its raised position as shown in Figure 11. The height of the cam 1345 is preferably of such magnitude that the starting lever 240 will be substantially overcocked, and the elongated hole 286 is provided for such overcocking and to allow the toggle links 288 and 265 to be returned to the position shown in Figure 11 by the torsion spring 259. The cam 1345 makes one-half revolution for each shift cycle; therefore, the starting lever 240 is re-cocked at half cycle or one-quarter revolution of shaft 1331, following which the starting lever 240 is permitted to lower the stud 242 until it seats in the bottom of the elongated hole 286, and the remainder of the cycle idly rotates cam 1345 until its low point again underlies the roller 1346.

If a tabulation is called for which will require six shift cycles before the tabulated position is reached, and the lever 240 is recocked during the first cycle, as just described, thus raising the T member 292 (Figure 10) with it and releasing the operating lever 250, the latter would, if allowed to return to its neutral position, stop the shift mechanism when only one of the six required cycles had been completed. For this reason means have been provided to latch the operating lever 250 in its operative position until only a partial cycle of operation is necessary to reach the tabulated position, at which time the latch will be disengaged to free the lever 250 and stop the shift.

For this purpose, operating arm latch 305 (Figure 10) is rockably mounted on stud 262 and has an upwardly extending arm 306 on which is formed a lateral extension 307 adapted to engage a projection 253 of the operating arm 250, while on the other extension of latch 305 is a slightly flattened nose 309 which underlies the roller 296 of lever 290. A torsion spring 310 is provided to urge the latch 305 in a clockwise direction about stud 262 by the pressure of one of its ends against an ear 311 and the other end against a stud 316 on lever 315 (Figure 7). As described in detail hereinbefore, the end control lever 290 (Figure 10) is rocked as soon as the tabulating controls are conditioned for a shift, and remains in that position until the tabulated position has nearly been reached; therefore, when said end control lever is rocked either clockwise or counter-clockwise from its central position, the roller 296 is removed from the nose 309 of the latch 305, thereby releasing the latch 305 to rock clockwise under the urge of spring 310 until its lateral extension 307 abuts the projection 253 of the operating arm 250, and upon subsequent rocking of the operating arm 250 by T member 292 the projection 253 is raised or lowered from behind the lateral extension 307, allowing said extension to move to a position where it overlies or underlies the projection 253, thereby latching the lever 250 against return movement after the T member 292 is raised.

When the tabulated position has nearly been reached, however, the end control lever 290 returns to the position shown in Figure 10, causing its roller 296 to ride up the side of nose 309 and rock latch lever 305 counter-clockwise to remove lateral extension 307 from underneath or above the projection 253 and allow operating arm 250 to return to its neutral position under the urge of spring 1400 (Figure 16), thus terminating the shift, as previously described.

The keys 200 comprise what is known in the art as a "flexible keyboard" wherein any latched down key 200 may be released by depressing any other key 200 just sufficiently to remove the latch bar 213 (Figure 5) enough to release the latched down key and then letting up on the second key before it has been depressed far enough to be latched down by the bar 213. Means are therefore provided to stop the carriage shifting operation if the same has been initiated by rocking of the bail 235 without setting one of the keys 200 in its latched down position, such as by depression of one of the value keys 100, as will be described hereinafter. If such procedure is followed, a spring 288 (Figure 10), tensioned between the lever 290 and the frame of the machine, will become effective to rock the shaft 285 in extreme counter-clockwise direction, as will be described hereinafter, to condition the tabulator mechanism for an automatic carriage shift to the left, the controller moving rightwardly. The only way to arrest such a tabulated shift is to rock the shaft 285 back to its neutral position, and for this purpose, a stud 313 (Figure 14) is riveted to the center frame 314 of the machine so as to lie in the path of the controller 270. The stud 313 is in the form of a cone, the upper side of which serves to cam the controller 270 upwardly as it reaches its extreme right end position to effect rocking of the control lever 280 and the shaft 285 to a neutral position as the controller 270 impinges upon its camming surface.

Means are also provided to stop a rightward carriage shift which may be initiated by depression of a tabulator key 200, followed by some misoperation, such as immediately depressing another tabulator key 200 just enough to release the first key, but not enough to latch the second key down, and then allowing the second key to rise. With no tabulation key 200 depressed, no control lever 280 will be positively held to stop a shift, and the driving mechanism would continue to run to attempt to shift the carriage beyond the right end position. Therefore, a stud 313a, similar to the stud 313 (Figure 14) is riveted to the left side frame, located in the path of the controller 270, so as to cam the controller downwardly as it reaches its extreme left hand position so as to stop the shift driving mechanism.

*Keyboard and dial clearance mechanism*

As shown in Figure 1, in juxtaposition with each other are, a keyboard clear key 122, the depression of which releases all value selecting keys 100 which may be latched in a depressed position, a "middle dial" clear key 373, the depression of which controls a clearing clutch to return to zero all accumulator dials 418 of the carriage 350, and an "upper dial" clear key 1910, the depression of which controls another clearing clutch to return to zero all counter dials 1874 also provided on the carriage 350.

Situated at the front of the machine is a keyboard clear bail 125 (Figures 19, 20 and 24) having arms extending rearwardly at either end thereof and pivoted on studs 126, fixedly mounted on the side frames of the machine. One of the arms 125' of the bail 125 (Figure 19) has a camming portion 127 formed thereon which is adapted to be engaged by a roller 124 carried on the key stem of the keyboard clear key 122 upon depression of this key. When it is desired to clear the keyboard, the key 122 is depressed, and on its downward movement, the roller 124 impinges the camming portion 127 of the clear bail 125 causing a tab 129 secured to the rearward surface of the bail 125 to engage all of the hereinbefore mentioned slidable locking slides 117 for the various value keys 100 to force the same rearwardly against the action of the various springs 118, thereby releasing all depressed keys 100.

The accumulator and counter dials are cleared by power derived from the motor 640 (Figure 22) under control of the keys 373 and 1910, respectively, instead of manually as in the case of the keyboard clear key 122.

The "upper dial" clear key 1910 (Figure 21), by which the clearing or zeroizing of the counter dials 1874 on the carriage 350 is effected, is secured to the upper end of a key stem 375 which is slidably mounted on a cross rod 374 and is pivoted at its lower end to bail 346 (Figures 21 and 25) by means of a bearing stud 371, said bail being pivotally mounted on a shaft 344 supported in the various fixed plates of the machine. A spring 372 is tensioned between the stationary rod 374 and the stud 371, thereby urging the key 1910 and the bail 346 into the position shown in Figure 21. On the downwardly extending arm of bail 346 is a shoulder stud 349 adapted to operate in the L-shaped aperture 348 of a link 347, said link being provided with a nose 345 adapted to ride upon a stud 343 secured to the framing of the machine, when it is moved forward by the bail 346. The rear end of the link 347 is connected to a bell crank 376, pivotally mounted on a stationary stud 377, and having a shoulder stud 378 secured to its upper end and adapted to be engaged by the bifurcated forward end of a clutch operating lever 379. This operating lever 379 is pivoted at 600 and is connected by a suitable bail 379' to a clutch dog 381 which is normally held in position to lock a clear clutch 1911 against rotation by a tension spring 382, extending between the lever 379 and a stud 382' mounted on the machine framing.

The clutch 1911 is of the well known cyclically operable type of clutches and similar to that shown in Figure 11 of U. S. Patent number 1,643,710 issued to C. M. Friden to which reference may be had for details thereof.

From the foregoing it is evident that on depression of the key 1910, the clutch dog 381 will be rocked counter-clockwise to release the clutch 1911, and upon engagement of this clutch rotation will be transmitted from a gear 361 (Figure 22) which is in mesh with the motor driven gear 647, through the clutch 1911 to a cam 1915 suitably secured to the driven side of the clutch 1911 so as to impart a counter-clockwise rocking movement to a cam follower 1916 pivoted at 365 and held against the cam by a spring 1366 which is tensioned between the follower 1916 and a pin 366' secured to the machine framing. The upper end of the cam follower 1916 is connected by means of an arm 1917 to a sleeve 1918 which is splined to a carriage supporting shaft 354, which shaft is journaled in and laterally shiftable with the carriage. This shaft is therefore rocked by operation of the clutch 1911, regardless of the position of the carriage, to effect return of all product dials to zero in a manner disclosed in the above mentioned Avery Patent No. 2,271,240.

In order to prevent continuous rotation of the clear clutch 360, in the event that the bail 346 should be held in a clockwise position by the key 1910 or by mechanism described hereinafter, the cam surface 345 on the link 347 rides up on the stud 343 as the bail 346 is being rocked clockwise, thereby camming the forward end of the link 347 upwardly to a position where the L-shaped aperture of the link will be moved to a position wherein the longitudinally extending opening thereof will be aligned with the pin 349, allowing the link 347 to be moved rearwardly under the action of the spring 382 until the clutch dog 381 contacts the housing of the clutch 1911 on which it rides until the clutch completes its cycle. At this time the dog 381 drops into a recess on the clutch housing to disengage the clutch until the key 1910 is again depressed. When the operator releases the clear key 1910, its stem and bail 346 will be restored to its illustrated position by the spring 372, this restoration moving the stud 349 rearwardly until the link 347 can drop down to the position shown in Figure 21.

The accumulator dials 418 are cleared in a manner similar to that just described in connection with the counter dials 1874. The accumulator or middle dial clear key 373 is mounted on a key stem which is slidably supported in exactly the same manner as the key stem 375 of the key 1910, and is pivotally connected by means of a pin 400 to a bracket 401 (Figures 11 and 25) which is suitably welded to a bail 402, the latter being pivoted on the shaft 344 and connected to a clear clutch 360, identical to that of clutch 1911, by linkage identical with that connected between the bail 346 and respective clear clutch 1911. The engagement of clutch 360 by removal of the associated clutch dog 381 causes a cam 363 secured thereto to be rotated and to transmit a rocking movement to a cam follower 364 about the shaft 365. Cam follower 364 is connected by means of a link 367 to an arm 368 secured to a sleeve 369 which is splined to a second carriage supporting shaft 359 to return to zero all accumulator dials as described in detail in the Avery Patent No. 2,271,240.

*Interlocks*

When the tabulating shift initiating bail 235 (Figure 4) is rocked upon depression of one of the tabulator keys 200 or otherwise as described hereinafter, simultaneously with rocking of either or both of the clear bails 346 and 402, it is necessary to provide means for disabling the shift controlling mechanism until the clearance operations are completed. This means comprises, in the clear control train, arms 400 and 400a (Figure 21) extending downwardly from the two identical bell cranks 376, either of which is adapted to restrain the shift controlling mechanism.

The shift control train includes the centralizer 1403, the lower end of which is pivotally connected by a stud 1411 to a link 1412, the rearmost end of which has an elongated hole 1414 formed therein and embracing a stud 401a secured to a bail 402a which is pivoted at 403a. A forwardly extending arm of the bail 402a is attached to the lower end of a link 404a, the upper end of which is pivotally connected to an arm of an interlock 393 pinned to a shaft 386 journaled in suitable bearings (not shown). A lateral extension 399 is formed on the upper end of the interlock 393 and is adapted to cooperate with the lower edge of either of the arms 400 and 400a on the bell cranks 376.

When the tabulator shift operating bail 235 and either or both of the clear keys are simultaneously operated, the arms 400, 400a, or both, are lowered behind the lateral extension 399 at the beginning of a downward movement of one end or the other of the clear key 373 and 1910 to hold the interlock 393 against clockwise movement before either a shifting or clearing operation is initiated. As the keys are further depressed, the dogs 381 release the corresponding clear clutch or clutches to function at approximately the same time as the tabulated shift is tripped for initiation, which, as will be recalled from the previous description, causes the T member 292 (Figure 11) to drop on to one of the ears 251 and 252 of the operating arm 250 under the tension of spring 245, thus rocking arm 250 (Figure 16) and tending to rock the lever 1375, thus centralizer 1403 must be forced to the left, carrying with it link 1412 (Figure 21). The stud 401a, being at the right end of the elongated hole 1414, is thus forced toward the left to effect a clockwise rocking of the bail 402a and thereby effect similar rocking of interlock 393. However, the arm 400 or 400a having been lowered behind the lateral extension 399 prevents this rocking of the interlock 393 and restrains the movement of the shift train just described, back as far as the levers 1480 and 1481 (Figure 16), which compresses the spring 1490 and thus functions to delay the shift operation until the clear clutch has completed its cycle. At this time the dog 381 (Figure 21) riding on the housing of the associated clear clutch drops into a recess therein, and the tension spring, as at 382, raises the arm 400 or 400a, or both, to the position shown in Figure 21. When both arms 400 and 400a are clear of the interlock 393, the interlock will be free to rock clockwise under the action of the spring 1490 and enable the shifting operation to start. Each of the levers 379 has a nose 383 depending therefrom and operable to rock a lever 385 about the shaft 386 to close a motor circuit for the motor 640 (Figure 22) in a manner disclosed completely in the Avery Patent No. 2,271,240. The interlock 393 also has a nose 397 thereon which is adapted to engage an ear 384 on the lever 385 for the same purpose.

Means are provided to allow the toggle links 265 and 288 (Figure 11) and the tabulator starting lever 240 to return to and be locked in their initial positions, even though the operator may be holding a tabulator key depressed after one-half of the first shift cycle has been completed. The starting lever 240 (Figure 11), has, on the lower end thereof, a leftwardly extending projection 247 adapted to rock the trigger 237 counter-clockwise about its stud 233 by engaging the stud 231, so that if the operator holds any of the keys 200 depressed, thus holding the trigger 237 in its upper position, the projection 247 on the end of lever 240 will force the trigger 237 out of engagement with the interponent 260 and allow this interponent to return to its extreme counter-clockwise position before the starting lever 240 is recocked, so as to prevent a repeated tripping of the starting lever 240.

*Tabulator controlled clearance initiating mechanism*

In accordance with the present invention, means are provided for automatically effecting operation of any or all of the clearance mechanisms described in the preceding sections upon rocking of the tabulating shift initiating bail 235 by depression of any of the tabulator keys 200 or by depression of a value key 100, as will be described hereinafter.

Referring to Figures 11, 24 and 25, an automatic clearance initiating lever 404 is provided which is pivoted on a stationary stud 405 extending from the machine framework and has a camming edge 406 formed on the upper surface thereof, and adapted to be engaged by a pin 407 on the starting member 240 as the same is rocked downward by the spring 245. The forward end of the lever 404 overlies a reduced end portion of a stud 408 secured to a bail 409 which is pivoted on the shaft 344. A pin 410 is carried by an upwardly extending arm of the bail 409 and has pivoted thereon, on either side of the arm bail 409, a pair of similar interponents 411 and 412. The interponent 411 has a pin 414 extending therefrom which is adapted to be engaged by a camming edge formed on a lever 415 which is pivoted on the cross rod 374 and has one end thereof extending upwardly through an opening formed in the keyboard cover plate 435 of the machine. A handle 416 is affixed to this upwardly extending portion of the lever 415 to permit manipulation of this lever. A projection 417 is also formed on the lever 415 and is engaged by a spring pressed ball 418a carried in an aperture formed in a cross bar 419 which comprises part of the machine frame. The ball 418a thereby yieldably maintains the lever in either of two manually set positions. A pair of shoulders 415a and 415b are formed on the lever 415 to limit the movement of the same.

A tension spring 420 is interposed between a forwardly extending arm on the interponent 411 and a bracket 421 secured to the bail 409 to urge the interponent 411 in a counter-clockwise direction into the position shown in Figure 11, to cause the pin 414 to engage the adjacent camming surface of the lever 415. Suitable means, such as a pin 499 extending through and projecting on both sides of the arm of bail 409, may be provided to prevent rocking of the interponents 411 or 412 in a counter-clockwise direction beyond that position illustrated in Figure 11.

Upon collapse of the toggle link arrangement comprising the links 265 and 288, due to rocking of the bail 235, the pin 407 engages the lever 404 to rock the same in a counter-clockwise direction, causing the forward end thereof to engage and rock the bail 409 clockwise causing the forwardly extending arm thereon to carry with it the two interponents 411 and 412. With the lever 415 in its illustrated position, the rearwardly extending arm of the interponent 411 is positioned by the spring 420 directly in front of the pin 371 which connects the key stem 375 of the key 1910 with its respective bail 346. Thus, as the interponent 411 is carried rearward, it engages the pin 371 and rocks the bail 346 clockwise about the shaft 344 to initiate a clearing operation for the counter dials 1874 in a manner described hereinbefore. If, however, the lever 415 is rocked into an extreme counter-clockwise position by manipulation of the handle 416, the camming surface 415' of the lever 415 will rock the interponent 411 into such a position that the rearward edge thereof will be removed from juxtaposition with the pivot pin 371. When in this position, subsequent rocking of the bail 409 by the lever 404 will cause the interponent 411 to miss the pin 371 in its travel and thus prevent automatic clearing operation for the upper counter dials.

The interponent 412 is adapted to be selectively positioned to strike or miss a pin 424 formed on an upwardly extending arm 425 of the bail 402 in precisely the same manner as the interponent 411 is positioned. For this purpose, a lever 422 identical with that of 415 is provided adjacent the key stem 373' and has a handle 423 (Figure 1), mounted on a portion thereof extending through an opening in the keyboard cover plate 435 whereby it may be manipulated independently of the handle 416.

The keyboard clearing mechanism may also be selectively conditioned to be automatically operated by the tabulator initiating mechanism, and to this end an interponent 426 (Figures 24 and 25) is pivoted on the stud 408 mounted on the bail 409. A pin 427 extends from the upper end of the interponent 426 and this interponent is urged in a clockwise direction by a spring 428 tensioned between the lower end of the interponent and the stud 126 for pivotally supporting the gate 125. The interponent 426 is limited in its rocking movement under the action of spring 428 by engagement of the pin 427 with a camming surface formed on an inclined downwardly extending tail 432' formed on a selectively set lever 432 which is pivoted on the cross rod 374. This lever 432 has shoulders 433 and 433a formed thereon on opposite sides of the rod 374 so as to engage the under surface of the plate 435 and limit rocking movement of the lever in either direction. A handle 434 is mounted on a portion of the lever 432 extending through an opening formed in the keyway cover plate 435 of the machine and is juxtaposed the keyboard clear key 122, as indicated in Figure 1, to enable the operator to selectively position the lever 432 in either its operative position as illustrated in Figure 24, or in an inoperative position wherein the shoulder 433a engages the under surface of the cover plate 435 thereby enabling the tension spring 428 to rock the interponent 426 from its illustrated position wherein the lower edge thereof is adapted to engage a pin 436 in the arm 125' of the ball 125 to a position wherein the lower edge thereof is adapted, on downward movement of the lever 404, to miss the pin 436. To hold the lever 432 in either of its two positions, suitable means (not shown) is provided. This is preferably in the form of a laterally extending spring pressed ball carried by the machine frame in a manner similar to that of ball 418a (Figure 11) and in engagement with one of the two enlarged portions of a figure eight shaped hole 500 (Figure 24) formed in the lever 432.

Means are provided to enable the keyboard clearing ball 125 to resume its normal position illustrated in Figure 24 immediately after being automatically rocked by operation of the lever 404 to shift the various locking slides 117 for release of any depressed keys 100. This provision thus conditions the keyboard for a new setting as soon as possible after tripping the starting lever 240 and rocking the ball 125 due to operation of this starting lever.

The various locking slides 117 (Figure 2) are so arranged that they are capable of a somewhat greater rearward movement beyond that actually required to unlatch any of the keys 100 and in accordance with this, movement of the ball 125 from its normal position illustrated in Figure 24 to a position wherein the pin 436 assumes the position A is sufficient to cause such unlatching of the keys. The ball may, however, be rocked further, at least until the pin 436 reaches the position B, due to the increased movement allowed the slides 117.

The camming surface of the tail 432' of lever 432 is so designed as to guide the interponent 426 (when the lever is set in its extreme clockwise position) in contact with the pin 436 until the pin reaches the position A. As the interponent 426 continues beyond this position and approaches the position B, the lowermost portion of the camming surface of tail 432' enables the interponent to rock slightly clockwise about the stud 408 until the lower edge thereof rides completely off of the pin 436, thereby enabling the different springs 118 (Figure 2) to move the ball 125 back to its normal position as the lever 404 approaches its lowermost position under the action of the starting lever 402.

To cause a positive rocking movement to be applied to the interponent 426 as it is moved downwardly while in engagement with the pin 436, a pin 502 (Figures 24 and 25) may be secured to the interponent and caused to ride along a stationary camming surface, formed on a suitable frame member (not shown) affixed to the machine framework to supplement the spring 428 and cause the interponent to snap from engagement with the pin 436 as it is moved from position A to position B. A suitable stop pin or the like (not shown) may also be provided to prevent clockwise rocking of the interponent 426, about the stud 408, under the action of the spring 428, beyond that necessary to completely miss the pin 436.

From the above it will be seen that the operator need not wait until the various clearing clutches (Figure 21) have operated and the tabulating shift mechanism has begun to operate before the ball 125 will be returned to its position shown in Figure 24 so as to enable the various locking slides 117 to be conditioned to again latch the keys 100 when a new setting is made. Since the rocking of arm 451 to selectively institute the various clearing, resetting and shifting operations is effected during the very first portion of the depression of a key 100, it is possible to have spring 245 (Figure 11) strong enough to complete the stroke of member 244, including the releasing of ball 125 and locking slides 117 into key locking operation, by the time the operator normally completes the downward stroke of key 100.

The provision of the selectively settable means for enabling any or all of the clearing mechanisms to be automatically initiated upon operation of the tabulation initiating mechanism relieves the operator of the necessity of attracting his attention to such clearing operations. Thus, at the end of a calculation, or at any time, he may merely depress one of the tabulator keys thus causing the carriage to move to a desired position, relying on this operation to effect the desired clearing operation.

*Keyboard controlled tabulator and clearance initiating mechanism*

Means are provided whereby a tabulated shift, and, if desired, a clearing operation for any or all of the clearing mechanisms, may be effected upon setting of any of the various value keys 100 at the beginning of a machine calculation.

As shown in Figures 2 and 3, a shaft 450 extends across the machine and is journaled in suitable bearings (not shown). A plurality of arms 451 are keyed to the shaft 450, the arms extending upwardly and each terminating in an ear 452 which is positioned in a notch 453 of the flange of a locking slide 117 aligned with the arm 451 and respective to each key section. Each of the notches 453 is of such a length as to enable the various arms 451 to be rocked as a unit rearwardly by rearward movement of a lock bar 117 upon depression of key 100 in a manner disclosed hereinbefore, without striking the rearmost edge of the notches 453 of those lock bars 117 which are not slid rearward by a key during such operation.

Keyed to the shaft 450 is a plate 454 (Figure 2) on which are riveted a pair of spaced shoulder studs 455 and 456, each of which is embraced by an elongated arcuate slot formed in an interponent 457. A spring 459 is tensioned between a pin 460 secured to the plate 454 and an ear 458 formed on the forward end of the interponent 457 to normally hold this interponent in the position illustrated in Figure 2. When the interponent 457 is in this position, depression of a key 100 will merely effect swinging of the plate 454 a limited amount without effecting engagement of the ear 458 with an arm 461 carried by the shaft 236 and suitably connected to the tabulator shift initiating bail 235 by a depending bifurcated portion 236' which is fitted over the foremost flange of the bail 235.

A latch 463 is pivoted to the plate 454 by means of a shoulder stud 464 and is urged into engagement with the under surface of the ear 458 of the interponent 457 by a spring 465 tensioned between the latch and the pin 460. As the interponent 457 is moved along the studs 455 and 456 into the position illustrated by the dot and dash lines 457' wherein it underlies the arm 461, a shoulder 466 on the latch 463 will snap into engagement with the rear surface of the ear 458 and thereby hold the interponent 457 in this position against the action of the tension spring 459. Thereafter, depression of any of the value keys 100 will, by causing a rocking movement to be imparted to the plate 454, cause the ear 458 on the interponent 457 to engage the under surface of the arm 461 to rock the bail 235 an amount sufficient to cause the trigger or link 237 (Figure 11) to cause collapse of the toggle link arrangement comprising the links 265 and 288 and enable the tension spring 245 to rock the starting lever 240 downwardly, thereby causing initiation of operation of any or all of the clearing mechanisms and the tabulating shift control mechanism, as was described previously.

The latch 463 may be held from latching the interponent in its operative position indicated by the dot and dash lines 457' and thereby render the value keys 100 ineffective to cause rocking of the bail 235. For this purpose, a lever 472 is provided, which is pivoted on a frame stud 473 suitably secured to the machine frame. The lower end of lever 472 has an ear 474 extending therefrom and adapted to engage a tail 463' on the latch 463. The upper end of lever 472 extends through a slot formed in the keyboard cover plate and terminates in a handle 475 (Figures 1 and 2). The lever is adapted to be held in either of two positions about the stud 473 by a pawl 477 pivoted on a stud 478 suitably secured to the machine frame. The pawl 477 is held in engagement with a pointed projection on the lever 472 by a spring 479 tensioned between a pin on the pawl and the stud 473.

When the lever 472 is maintained in the position illustrated in Figure 2, the ear 474 thereon will not engage the tail 463' of latch 463 at any time and will therefore allow the spring 465 to rock the latch into latching engagement with the interponent 457. However, when the lever 472 is rocked to an extreme clockwise position wherein it is held by the pawl 477, the ear 474 thereon will rock the latch 463 slightly counter-clockwise against the action of spring 465 and hold it in this position, wherein the latch will be held from engagement with the ear 458 of the interponent 457 as the interponent is moved to its operative position in the manner to be described presently.

To effect movement of the interponent 457 into its operative position, illustrated by the dot and dash line 457', a curved lever 1465 is pivoted on the hereinbefore mentioned shaft 301 and has its forward end overlying an ear 466 extending from the interponent 457 adjacent the top end thereof.

An upwardly extending arm 465' of the lever 1465 lies in the path of the shaft 1213 which, as was described hereinbefore, is rocked in a counter-clockwise direction about the shaft 301 by operation of the setting clutch at the start of a machine calculation.

It will be seen therefore that as the setting clutch 431 is rotated to cause, among other things, the feeler noses 1219 and 1211 to sense the various cams of the cam unit 146 and set the various plates 172 accordingly, in advance of the actual driving operation of the registers, the shaft 1213 will engage and rock the lever 1465 against the action of a spring 470 tensioned between the lever and a pin 271 affixed to the machine framework, causing the forward end of this lever to move the interponent 457 to its operative position where it will be latched by the latch 463 so as to be capable of rocking the arm 461 upon depression of any of the value keys 100 at the setting of a factor on the keyboard for a subsequent calculation. It will be noted that the forward end of the lever 1465 has a short downwardly inclined edge 465a which, upon engaging projection 466 of interponent 457, acts as a camming face to rotate the plate 454 to its extreme counter-clockwise position and to hold it there during the time that the lever 465 is operating to move the interponent 457 to its latched position.

As the first value key 100 is depressed after a calculation involving operation of the setting clutch, the locking slide 117 associated therewith will be moved rearward to rock the arm 451, shaft 450, and plate 454, causing the ear 458 of the now latched interponent 457 to engage and rock the arm 461, thereby effecting operation of the starting lever 240 (Figure 11). If any of the handles 416, 423, or 434, are set in a depressed position, a clearance operation will then ensue at the end of which a tabulated carriage shift will be effected to move the carriage to the position determined by depression of one of the tabulation control keys 200.

Secured to the lever 300 (Figures 2 and 11) is a pin 468 which, upon counter-clockwise rocking of the lever 300 due to downward movement of the lever 240 under the influence of the tension spring 245, the pin 468 engages a hooked arm 469 on the latch 463 and thus rocks the latch 463 from engagement with the interponent 457 to allow the spring 459 to move said interponent to its inoperative position illustrated in Figure 2. Therefore, depression of additional value keys 100 for effecting a set-up of a value to be entered into the machine will be ineffective to rock the bail 235.

If desired, a spring 288 (Figure 10) may be tensioned between the lever 290 and a fixed stud on the frame of the machine (not shown) to automatically position the shaft 285 to cause a tabulator carriage shift to the left whenever the bail 235 is rocked without a carriage position having been selected by depression of a tabulator selection key 200. The shaft 285 being thus rotated to its extreme counter-clockwise position, moves the T member 292 to position its arm 294 over the ear 251 of the arm 250, enabling the starting member 240, when rocked by the spring 245, to cause the T member 292 to rock the member 250 in a counter-clockwise direction as viewed in Figure 16, and thereby effect a carriage shift.

*Operation*

To more clearly illustrate the advantages of the present invention, specific examples of the operation of the machine to which the invention is applied will be given.

In addition to the clear keys 122, 373, and 1910 (Figure 1), and the tabulator control keys 200, the machine in which the present invention is embodied, and which is disclosed in detail in the above mentioned Avery Patent No. 2,271,240, comprises two shift control keys 1405 and 1406 to permit manual control of the carriage shift mechanism to effect shifting in either direction, a zero multiplier key 2001.

If the multiplicand is to remain the same during a number of calculations, and the various keys 100 need not be released after each of the calculations and, therefore, the handle 434 is raised to an upper position to disable automatic clearance of the keyboard. Since a tabulated shift of the carriage will not, in this case, be effected by the value keys, such operation is caused by further depressing the tabulator key 200 which has previously been set, or by depressing a tabulator key corresponding to the number of digits in the succeeding multiplier, this operation initiating clearance of the register dials, if so predetermined by proper setting of handles 416 and 423, as well as a shift of the carriage.

In an example where the number of multiplier digits is not the same but differs widely during a series of calculations, so that no position can be readily selected for the carriage throughout this series, the proper one of the tabulator keys may be completely depressed after each computation to effect automatic clearance and carriage shift to the selected position.

If, for example, an operator makes a series of computations of the same type, such as multiplication, in which the multipliers have the same average number of digits before the decimal point, the operator may latch down a tabulator key corresponding to the sum of this number and the number of decimal places it is desired to accommodate. Assuming that the multiplier ranges from two to five digits before the decimal point, but that the average number is four, and also assuming that the decimal marker 1875 (Figure 1) is moved along its scale 1876 in the well known manner until it is positioned between the number "3" and "4" carriage positions to accommodate three digits after the decimal point in the multiplier, the operator selects and depresses the number "7" tabulator key 200 to its latched down position to control movement of the carriage to its number "7" position on initiation of the tabulated shift. Preparatory to each subsequent calculation the multiplicand is set-up in the keyboard and the depression of the first value key 100 for this purpose wil cause rocking of the bail 235. If the handles 416, 423 and 424 have previously been depressed into their lowermost positions to cause automatic initiation of clearance for the keyboard and the accumulator and counter dials, the dials will now be cleared and the various previously depressed keys 100 will be released from their latch positions. Since this clearing action of the keys is only momentary, as was described hereinbefore, and begins immediately after the operator depresses the first value key, it will be seen that the operator need hold the first value key for the new set-up down for only an instant before the locking slides 117 (Figures 2 and 20) are again in position to latch the same.

The remainder of the value keys are then depressed to set-up the multiplicand, which operation may take place while the carriage is moving to its tabulated position. If the multiplier of the next example has only three whole number digits, for example 725, the operator may either consecutively depress the 0—7—2—5 multiplier keys 2001 and 2002, the zero serving to shift the carriage one order to the left (assuming the automatic direction control key 1201 has been depressed) before the multiplication operation functions, or he may depress either the number "6" tabulator key 200 to its lowermost position, or depress shift effecting key 1406 to position the carriage in its number "6" position before proceeding with the multiplication.

I claim:

1. In a motor driven calculating machine having settable value selecting devices, setting means therefor comprising a keyboard including a plurality of depressible keys and latches for retaining said keys depressed; clearing mechanism for said keyboard comprising means for concurrently releasing all of said key latches, a settable operating device, and means operable by said motor for adjusting said operating device to set condition; the combination of means adjustable to effective and ineffective conditions and capable, when adjusted to effective condition, of being actuated by any of a plurality of keys of said keyboard to actuate said operating device, when adjusted to set condition, to cause said operating device to operate said clearing mechanism, and means operable by said motor for adjusting said adjustable means to effective condition.

2. In a motor driven calculating machine having settable value selecting devices, setting means therefor comprising a keyboard including a plurality of depressible keys and latches for retaining said keys depressed; clearing mechanism for said keyboard comprising means for concurrently releasing all of said key latches, a settable operating device, and means operable by said motor for adjusting said operating device to set condition; the combination of means adjustable to effective and ineffective conditions and capable, when adjusted to effective condition, of being actuated by any of a plurality of keys of said keyboard to actuate said operating device, when adjusted to set condition, to cause said operating device to operate said clearing mechanism, means operable by said motor for adjusting said adjustable means to effective condition, and means automatically operable upon actuation of said operating device to adjust said adjustable means to ineffective condition.

3. In a motor driven calculating machine having settable value selecting devices, setting means therefor comprising a keyboard including a plurality of depressible keys and latches for retaining said keys depressed; clearing mechanism for said keyboard comprising means for concurrently releasing all of said key latches, a settable operating device, and means operable by said motor for adjusting said operating device to set condition; the combination of means adjustable to effective and ineffective condition and capable, when adjusted to effective condition, of being actuated by any of a plurality of keys of said keyboard to actuate said operating device, when adjusted to set condition, to cause said operating device to operate said clearing mechanism and to immediately thereafter release said clearing mechanism to render the key latches operative to retain the actuating key, means operable by said motor for adjusting said adjustable means to effective condition, and means automatically operable upon actuation of said operating device to adjust said adjustable means to ineffective condition.

4. In a motor driven calculating machine having settable value selecting devices, setting means therefor comprising a keyboard including a plurality of depressible keys and latches for retaining said keys depressed; clearing mechanism for said keyboard comprising means for concurrently releasing all of said key latches, a settable operating device, means operable by said motor for adjusting said operating device to set condition, and means for holding said operating device in set condition after adjustment thereof by said last named means; the combination of means adjustable to effective and ineffective conditions and capable, when adjusted to effective condition, of being actuated by any of a plurality of keys of said keyboard for rendering said holding means ineffective, means operable by said motor for adjusting said adjustable means to effective condition, means automatically effective in response to the rendering ineffective of said holding means for removing said operating device from set condition, and means automatically operable by said operating device upon movement thereof from set condition to actuate said clearing mechanism.

5. In a motor driven calculating machine having settable value selecting devices, setting means therefor comprising a keyboard including a plurality of depressible keys and latches for retaining said keys depressed; clearing mechanism for said keyboard comprising means for concurrently releasing all of said key latches, a settable operating device, means operable by said motor for adjusting said operating device to set condition, and means for holding said operating device in set condition after adjustment thereof by said last named means; the combination of means adjustable to effective and ineffective conditions and capable, when adjusted to effective condition, of being actuated by any of a plurality of keys of said keyboard for rendering said holding means ineffective, means operable by said motor for adjusting said adjustable means to effective condition, means automatically effective in response to the rendering ineffective of said holding means for removing said operating device from set condition, means automatically operable upon removal of said operating device from set condition to adjust said adjustable means to ineffective condition, and means automatically operable by said operating device upon movement thereof from set condition to actuate said clearing mechanism.

6. In a motor driven calculating machine having settable value selecting devices, setting means therefor comprising a keyboard including a plurality of depressible keys; and normalizing mechanism; the combination of an operating device for said normalizing mechanism comprising means operable by power derived from the motor to actuate said normalizing mechanism, and means for initiating operation of said power operable means; and control means for said operating device comprising mechanism operable by any of a plurality of the keys of said keyboard, and means operable by said key operable mechanism including an element selectively settable to effect an operating connection between said last mentioned mechanism and said operation initiating means, means operable by power derived from the motor for setting said element to its effective position, and means operable as an incident to actuation of said operation initiating means by said control means for setting said element to its ineffective position.

7. In a motor driven calculating machine having settable value selecting devices, setting means therefor comprising a keyboard including a plurality of depressible keys; and normalizing mechanism; the combination of an operating device for said normalizing mechanism comprising means operable by power derived from the motor to actuate said normalizing mechanism, and means for initiating operation of said power operable means; and control means for said operating device comprising mechanism operable by any of a plurality of the keys of said keyboard, means operable by said key operable mechanism including an element selectively settable to effect an operating connection between said last mentioned mechanism and said operation initiating means, spring means normally effective to retain said element in its ineffective position, means for holding said element in its effective position, and means operable by said motor for setting said element to its effective position.

8. In a motor driven calculating machine having settable value selecting devices, setting means therefor comprising a keyboard including a plurality of depressible keys; and normalizing mechanism; the combination of an operating device for said normalizing mechanism comprising means operable by power derived from the motor to actuate said normalizing mechanism, and means for initiating operation of said power operable means; and control means for said operating device comprising mechanism operable by any of a plurality of the keys of said keyboard, means operable by said key operable mechanism including an element selectively settable to effect an operating connection between said last mentioned mechanism and said operation initiating means, spring means normally effective to retain said element in its ineffective position, means for holding said element in its effective position, means operable by said motor for setting said element to its effective position, and settable means for disabling said holding means.

9. In a motor driven calculating machine having settable value selecting devices, setting means therefor comprising a keyboard including a plurality of depressible keys and latches for retaining said keys depressed; and clearing mechanism for said keyboard comprising means for concurrently releasing all of said key latches; the combination of an operating device for said clearing mechanism comprising means operable by power derived from the motor to actuate and release said clearing mechanism, and means for initiating operation of said power operable means; and control means for said operating device comprising mechanism operable by any of a plurality of the keys of said keyboard, and means operable by said key operable mechanism including an element selectively settable to effect an operating connection between said last mentioned mechanism and said operation initiating means, means operable by power derived from the motor for setting said element to its effective position, and means operable as an incident to actuation of said operation initiating means by said control means for setting said element to its ineffective position.

10. In a motor driven calculating machine having settable value selecting devices, setting means therefor comprising a keyboard including a plurality of depressible keys and latches for retaining said keys depressed; and clearing mechanism for said keyboard comprising means for concurrently releasing all of said key latches; the combination of an operating device for said clearing mechanism comprising means operable by power derived from the motor to actuate and release said clearing mechanism, and means for initiating operation of said power operable means; and control means for said operating device comprising mechanism operable by any of a plurality of the keys of said keyboard, means operable by said key operable mechanism including an element selectively settable to effect an operating connection between said last mentioned mechanism and said operation initiating means, spring means normally effective to retain said element in its ineffective position, means for holding said element in its effective position, and means operable by said motor for setting said element to its effective position.

11. In a motor driven calculating machine having settable value selecting devices, setting means therefor comprising a keyboard including a plurality of depressible keys and latches for retaining said keys depressed; and clearing mechanism for said keyboard comprising means for concurrently releasing all of said key latches; the combination of an operating device for said clearing mechanism comprising means operable by power derived from the motor to actuate and release said clearing mechanism, and means for initiating operation of said power operable means; and control means for said operating device comprising mechanism operable by any of a plurality of the keys of said keyboard, means operable by said key operable mechanism including an element selectively settable to effect an operating connection between said last mentioned mechanism and said operation initiating means, spring means normally effective to retain said element in its ineffective position, means for holding said element in its effective position, means operable by said motor for setting said element to its effective position, and settable means for disabling said holding means.

12. In a motor driven calculating machine having a cyclically operable actuating mechanism, control mechanism therefor including an actuation initiating key, settable value selecting devices for said actuating mechanism, setting means for said devices comprising a keyboard including a plurality of depressible keys; and normalizing mechanism; the combination of an operating device for said normalizing mechanism comprising means operable by power derived from the motor to operate said normalizing mechanism, and means for initiating operation of said power operable means; and control means for said operating device comprising mechanism operable by any of a plurality of the keys of said keyboard, means operable by said key operable mechanism including an element selectively settable to effect an operating connection between said last mentioned mechanism and said operation initiating means, means operable in response to said actuation initiating key upon actuation thereof for setting said element to its effective position and means operable as an incident to actuation of said operation initiating means by said control means for setting said element to its ineffective position.

HAROLD T. AVERY.